US011641909B2

(12) United States Patent
Guest et al.

(10) Patent No.: US 11,641,909 B2
(45) Date of Patent: *May 9, 2023

(54) ARTICLE OF FOOTWEAR WITH TUBULAR STRUCTURES HAVING TAB PORTIONS

(71) Applicant: NIKE, Inc., Beaverton, OR (US)

(72) Inventors: Stefan E. Guest, Portland, OR (US); Matthew J. Holmes, Portland, OR (US); Yoav Sterman, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 518 days.

This patent is subject to a terminal disclaimer.

(21) Appl. No.: 15/370,934

(22) Filed: Dec. 6, 2016

(65) Prior Publication Data

US 2017/0156444 A1 Jun. 8, 2017

Related U.S. Application Data

(60) Provisional application No. 62/263,923, filed on Dec. 7, 2015, provisional application No. 62/263,916, filed (Continued)

(51) Int. Cl.
*A43C 1/06* (2006.01)
*A43B 23/02* (2006.01)
(Continued)

(52) U.S. Cl.
CPC .................. *A43C 1/06* (2013.01); *A43B 3/26* (2013.01); *A43B 13/181* (2013.01); *A43B 13/22* (2013.01);
(Continued)

(58) Field of Classification Search
CPC .. A43C 1/003; A43C 1/00; A43C 1/06; A43C 1/04; A43C 11/16; A43C 7/00;
(Continued)

(56) References Cited

U.S. PATENT DOCUMENTS 2,112,613 A * 3/1938 Waxelbaum ........... A43B 3/122
36/11.5
5,291,671 A 3/1994 Caberlotto et al.
(Continued)

FOREIGN PATENT DOCUMENTS

CN 103813731 A 5/2014
CN 104080362 A 10/2014
(Continued)

OTHER PUBLICATIONS

English translation of CN204763616 from worldwide.espacenet.com, Nov. 18, 2015.*

(Continued)

*Primary Examiner* — Nathan E Durham
*Assistant Examiner* — Abby M Spatz
(74) *Attorney, Agent, or Firm* — Klarquist Sparkman, LLP

(57) ABSTRACT

An article of footwear has a tubular structure. The tubular structure may include tab portions that extend away from a tunnel portion of the tubular structure. The tab portions may engage parts of the article of footwear. The tab portions may engage an upper or sole structure along a bite line. The tab portions may be attached to a heel counter, eyestay, or other structure on the article of footwear.

19 Claims, 19 Drawing Sheets

Related U.S. Application Data on Dec. 7, 2015, provisional application No. 62/263,898, filed on Dec. 7, 2015, provisional application No. 62/263,891, filed on Dec. 7, 2015, provisional application No. 62/263,834, filed on Dec. 7, 2015.

(51) Int. Cl.

| | | |
|---|---|---|
| *A43C 1/04* | (2006.01) | |
| *A43C 7/00* | (2006.01) | |
| *A43C 11/16* | (2006.01) | |
| *A43C 1/00* | (2006.01) | |
| *A43B 3/26* | (2006.01) | |
| *A43B 23/24* | (2006.01) | |
| *A43B 23/04* | (2006.01) | |
| *B29C 64/112* | (2017.01) | |
| *B29C 64/30* | (2017.01) | |
| *A43B 23/00* | (2006.01) | |
| *B29C 64/00* | (2017.01) | |
| *B29C 64/106* | (2017.01) | |
| *B33Y 10/00* | (2015.01) | |
| *B33Y 80/00* | (2015.01) | |
| *B29D 35/12* | (2010.01) | |
| *A43B 13/18* | (2006.01) | |
| *A43B 13/22* | (2006.01) | |
| *B29C 64/118* | (2017.01) | |
| *B29K 101/12* | (2006.01) | |
| *B29L 31/50* | (2006.01) | |
| *B29L 31/00* | (2006.01) | |

(52) U.S. Cl.
CPC ............... *A43B 23/00* (2013.01); *A43B 23/02* (2013.01); *A43B 23/0245* (2013.01); *A43B 23/042* (2013.01); *A43B 23/24* (2013.01); *A43C 1/00* (2013.01); *A43C 1/04* (2013.01); *A43C 7/00* (2013.01); *A43C 11/16* (2013.01); *B29C 64/00* (2017.08); *B29C 64/106* (2017.08); *B29C 64/112* (2017.08); *B29C 64/30* (2017.08); *B29D 35/12* (2013.01); *B33Y 10/00* (2014.12); *B33Y 80/00* (2014.12); *A43D 2200/60* (2013.01); *B29C 64/118* (2017.08); *B29K 2101/12* (2013.01); *B29K 2995/0082* (2013.01); *B29L 2031/505* (2013.01); *B29L 2031/727* (2013.01)

(58) Field of Classification Search
CPC .... A43C 9/00; A43C 1/02; A43C 5/00; A43B 11/00; A43B 23/00; A43B 23/042; A43B 23/02; A43B 3/26; A43B 13/181; A43B 23/0245; A43B 23/24; A43B 13/22; B29L 2031/505
USPC .................................................. 36/50.1, 15
See application file for complete search history.

(56) References Cited

U.S. PATENT DOCUMENTS

| | | | |
|---|---|---|---|
| 5,371,957 A * | 12/1994 | Gaudio | A43B 11/00 36/45 |
| 5,463,822 A | 11/1995 | Miller | |
| 6,052,921 A * | 4/2000 | Oreck | A43C 1/00 36/50.1 |
| 6,088,936 A | 7/2000 | Bahl | |
| 9,192,204 B1 | 11/2015 | Liles et al. | |
| 2003/0177662 A1 | 9/2003 | Elkington et al. | |
| 2004/0181972 A1 | 9/2004 | Csorba | |
| 2006/0000116 A1* | 1/2006 | Brewer | A43B 3/12 36/50.1 |
| 2010/0043254 A1 | 2/2010 | Dobbin et al. | |
| 2012/0144631 A1* | 6/2012 | Stanev | A43C 1/02 24/715.3 |
| 2012/0174437 A1 | 7/2012 | Heard | |
| 2014/0020191 A1 | 1/2014 | Jones et al. | |
| 2014/0020192 A1 | 1/2014 | Jones et al. | |
| 2014/0067106 A1 | 3/2014 | Makeig | |
| 2014/0196311 A1* | 7/2014 | Follet | B32B 5/26 36/45 |
| 2014/0196315 A1 | 7/2014 | Beye et al. | |
| 2014/0196316 A1 | 7/2014 | Follet | |
| 2014/0245638 A1 | 9/2014 | Seamarks et al. | |
| 2015/0026937 A1* | 1/2015 | Nonogawa | A43C 1/006 24/713.4 |
| 2015/0059206 A1 | 3/2015 | Lovett et al. | |
| 2015/0237962 A1 | 8/2015 | Soderberg et al. | |

FOREIGN PATENT DOCUMENTS

| | | |
|---|---|---|
| CN | 204763616 U | 11/2015 |
| WO | WO 2008/007403 A1 | 1/2008 |

OTHER PUBLICATIONS

International Search Report and Written Opinion, dated Aug. 17, 2017, for corresponding International Patent Application No. PCT/US2016/065187, 19 pages.

\* cited by examiner

ARTICLE OF FOOTWEAR WITH TUBULAR STRUCTURES HAVING TAB PORTIONS

CROSS-REFERENCE TO RELATED APPLICATIONS

This application claims the benefit of U.S. Provisional Application No. 62/263,916, filed on Dec. 7, 2015 and entitled "Article of Footwear with Tubular Structures," U.S. Provisional Application No. 62/263,923, filed Dec. 7, 2015 and entitled "Tunnel Spring Structures," U.S. Provisional Application No. 62/263,898, filed Dec. 7, 2015 and entitled "Article of Footwear with Tubular Structures Having Tab Portions," U.S. Provisional Application No. 62/263,834, filed Dec. 7, 2015 and entitled "Three-Dimensional Printing Utilizing a Captive Element," and U.S. Provisional Application No. 62/263,891, filed Dec. 7, 2015 and entitled "Segmented Tunnels on Articles," the disclosures of which are herein incorporated by reference in their entirety.

BACKGROUND

The present embodiments relate generally to articles of footwear, and in particular to articles of footwear with uppers and sole structures.

Articles of footwear generally include two primary elements: an upper and a sole structure. The upper may be formed from a variety of materials that are stitched or adhesively bonded together to form a void within the footwear for comfortably and securely receiving a foot. The sole structure is secured to a lower portion of the upper and is generally positioned between the foot and the ground. In many articles of footwear, including athletic footwear styles, the sole structure often incorporates an insole, a midsole, and an outsole.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
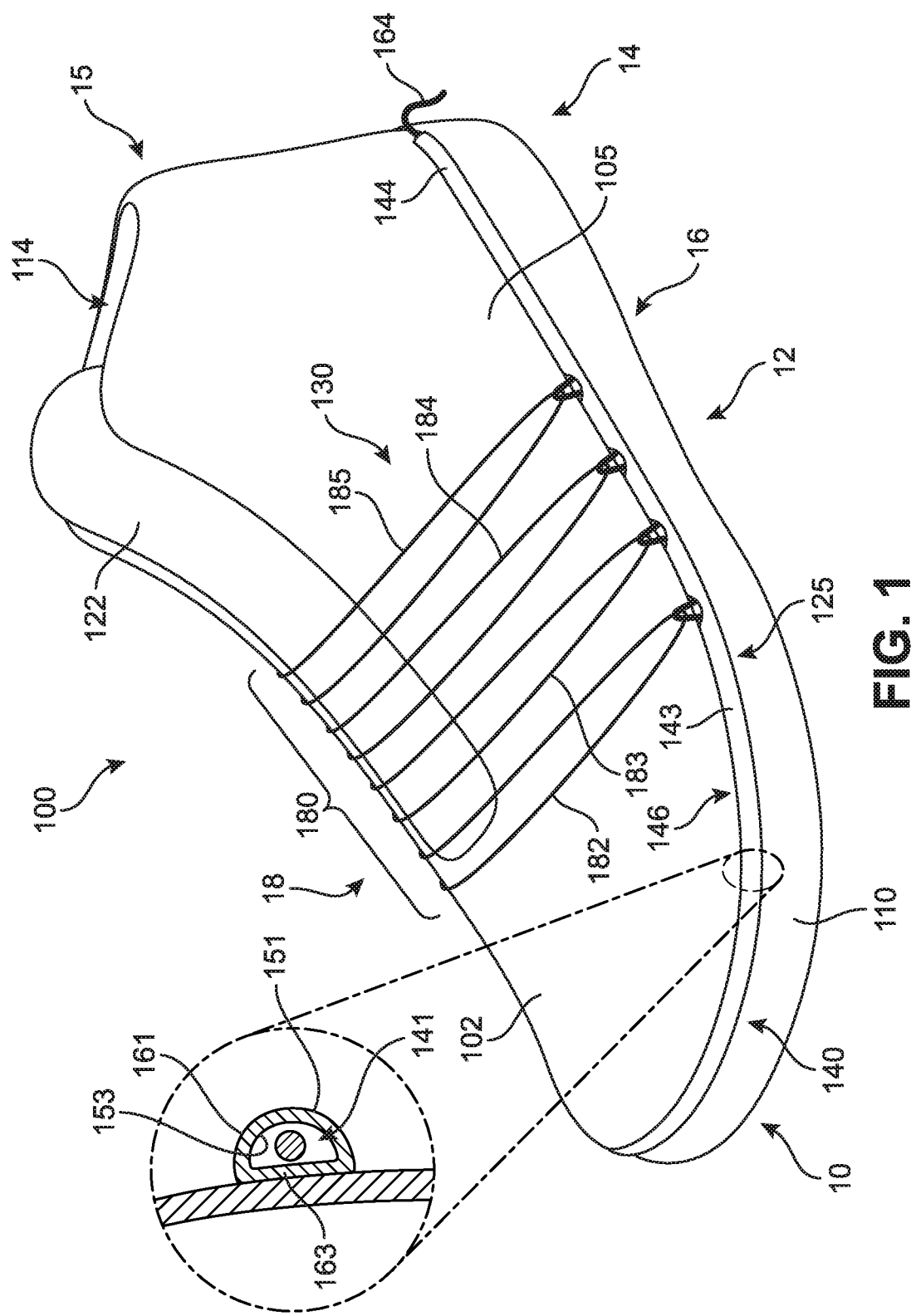
FIG. 1 is a schematic isometric view of an embodiment of an article of footwear including a tensioning system with a tubular structure.

The embodiments include articles of footwear with tubular structures for using in applying tension through one or more regions of the article of footwear, as well as methods for printing the tubular structures onto the articles of footwear. The tubular structure may extend along an upper of the article of footwear.

The embodiments provide an article of footwear with an upper. The article also includes a tubular structure with a first end, a second end, and an intermediate portion disposed between the first end and the second end. The tubular structure forms a tunnel extending through the tubular structure from the first end to the second end. The article further includes a first tensile strand extending through at least a portion of the tunnel of the tubular structure. The intermediate portion of the tubular structure includes a tab portion that extends away from the intermediate portion. The tab portion is attached to the article of footwear and anchors the tubular structure to the article of footwear.

Embodiments also provide an article of footwear with an upper and a sole structure joined at least at a bite line of the article of footwear. The article further includes a tubular structure with a first end, a second end, and an intermediate portion disposed between the first end and the second end. The tubular structure forms a tunnel extending through the tubular structure from the first end to the second end, where the intermediate portion of the tubular structure includes a surface with an opening that extends to the tunnel. The article also includes a first tensile strand extending through the tunnel of the tubular structure. A second tensile strand has a first portion attached to an attachment region of the article of footwear. The second tensile strand also has a second portion engaged with the first tensile strand proximate the opening. The intermediate portion is disposed adjacent the bite line of the article of footwear.

Embodiments also provide a method of making an article of footwear with an upper. The method includes a step of receiving a customized design for a tubular structure. The method also includes printing a print material onto a surface of the upper to form the tubular structure with a tunnel, where the tubular structure is printed with an opening that extends from a surface of the tubular structure to the tunnel. The method also includes printing the print material to form a tab portion that is integral with the tubular structure. The method also includes inserting a tensile strand through the tunnel of the tubular structure.

Other systems, methods, features, and advantages of the embodiments will be, or will become, apparent to one of ordinary skill in the art upon examination of the following figures and detailed description. It is intended that all such additional systems, methods, features, and advantages be included within this description, be within the scope of the embodiments, and be protected by the following claims.

Certain aspects, advantages, and novel features of the embodiments of this disclosure are described herein in the context of various embodiments; however, the disclosed methods, systems, and apparatus are not limited to any specific aspect, feature, or combination thereof. For example, the embodiments may make use of any of the structures, components, and/or methods as disclosed in U.S. Patent Application No. 62/263,898, filed Dec. 7, 2015, titled "Article of Footwear with Tubular Structures," the entirety of which is herein incorporated by reference (hereafter referred to as the "Articles with Tubular Structures application"). The embodiments may also make use of any of the structures, components, and/or methods as disclosed in U.S. Patent Application No. 62/263,891, filed Dec. 7, 2015, titled "Segmented Tunnels on Articles," the entirety of which is herein incorporated by reference. The embodiments may also make use of any of the structures, components, and/or methods as disclosed in U.S. Patent Application No. 62/263,923, filed Dec. 7, 2015, titled "Tunnel Spring Structures," the entirety of which is herein incorporated by reference.

FIG. 1 is an isometric view of an embodiment of an article of footwear 100. In the exemplary embodiment, article of footwear 100 has the form of an athletic shoe. However, in other embodiments, the provisions discussed herein for article of footwear 100 could be incorporated into various other kinds of footwear including, but not limited to, basketball shoes, hiking boots, soccer shoes, football shoes, sneakers, running shoes, cross-training shoes, rugby shoes, baseball shoes as well as other kinds of shoes. Moreover, in some embodiments, the provisions discussed herein for article of footwear 100 could be incorporated into various other kinds of non-sports-related footwear, including, but not limited to, slippers, sandals, high-heeled footwear, and loafers.

For purposes of clarity, the following detailed description discusses the features of article of footwear 100, also referred to simply as article 100. However, it will be understood that other embodiments may incorporate a corresponding article of footwear (e.g., a left article of footwear when article 100 is a right article of footwear) that may share some, and possibly all, of the features of article 100 described herein and shown in the figures.

The embodiments may be characterized by various directional adjectives and reference portions. These directions and reference portions may facilitate in describing the portions of an article of footwear. Moreover, these directions and reference portions may also be used in describing subcomponents of an article of footwear (e.g., directions and/or portions of a midsole structure, an outer sole structure, an upper, or any other components).

For consistency and convenience, directional adjectives are employed throughout this detailed description corresponding to the illustrated embodiments. The term "longitudinal" as used throughout this detailed description and in the claims refers to a direction extending a length of a component (e.g., an upper or sole component). A longitudinal direction may extend along a longitudinal axis, which itself extends between a forefoot portion and heel portion of the component. Also, the term "lateral" as used throughout this detailed description and in the claims refers to a direction extending along a width of a component. A lateral direction may extend along a lateral axis, which itself extends between a medial side and lateral side of a component. Furthermore, the term "vertical" as used throughout this detailed description and in the claims refers to a direction extending along a vertical axis, which itself is generally perpendicular to a lateral axis and longitudinal axis. For example, in cases where an article is planted flat on a ground surface, a vertical direction may extend from the ground surface upward. Additionally, the term "inner" refers to a portion of an article disposed closer to an interior of an article, or closer to a foot when the article is worn. Likewise, the term "outer" refers to a portion of an article disposed further from the interior of the article or from the foot. Thus, for example, the inner surface of a component is disposed closer to an interior of the article than the outer surface of the component. This detailed description makes use of these directional adjectives in describing an article and various components of the article, including an upper, a midsole structure, and/or an outer sole structure.

Article 100 may be characterized by a number of different regions or portions. For example, article 100 could include a forefoot portion, midfoot portion, heel portion, and an ankle portion. Moreover, components of article 100 could likewise comprise corresponding portions. Referring to FIG. 1, article 100 may be divided into forefoot portion 10, midfoot portion 12, and heel portion 14. Forefoot portion 10 may be generally associated with the toes and joints connecting the metatarsals with the phalanges. Midfoot portion 12 may be generally associated with the arch of a foot. Likewise, heel portion 14 may be generally associated with the heel of a foot, including the calcaneus bone. Article 100 may also include ankle portion 15 (which may also be referred to as a cuff portion). In addition, article 100 may include lateral side 16 and medial side 18. In particular, lateral side 16 and medial side 18 may be opposing sides of article 100. Furthermore, both lateral side 16 and medial side 18 may extend through forefoot portion 10, midfoot portion 12, heel portion 14, and ankle portion 15.

As shown in FIG. 1, article 100 may comprise upper 102 and sole structure 110. In some embodiments, sole structure 110 may be configured to provide traction for article 100. In addition to providing traction, sole structure 110 may attenuate ground reaction forces when compressed between the foot and the ground during walking, running, or other ambulatory activities. The configuration of sole structure 110 may vary significantly in different embodiments to include a variety of conventional or non-conventional structures. In some cases, the configuration of sole structure 110 can be configured according to one or more types of ground surfaces on which sole structure 110 may be used. Examples of ground surfaces include, but are not limited to, natural turf, synthetic turf, dirt, hardwood flooring, as well as other surfaces.

Sole structure 110 is secured to upper 102 and extends between the foot and the ground when article 100 is worn. In different embodiments, sole structure 110 may include different components. For example, sole structure 110 may include an outsole, a midsole, and/or an insole. In some cases, one or more of these components may be optional.

Upper 102 may include a variety of provisions for receiving and covering a foot, as well as securing article 100 to the foot. In some embodiments, upper 102 includes opening 114 that provides entry for the foot into an interior cavity of upper 102. In some embodiments, upper 102 may include tongue 122 that provides cushioning and support across the instep of the foot. Some embodiments may include fastening provisions, including, but not limited to, laces, cables, straps, buttons, zippers as well as any other provisions known in the art for fastening articles. In the embodiment shown in FIG. 1, a particular tensioning system for tensioning one or more regions of upper 102 is shown, which is described in further detail below. However, other embodiments could incorporate additional and possibly separate tensioning or fastening systems, including more traditional lacing systems that may be used to close opening 114 around a foot. Moreover, for purposes of clarity, the exemplary embodiment does not include a lace, strap, or other fastening feature that might be used to fasten opening 114. Instead, the exemplary embodiment makes use of a set of tensile strands to apply tension over the instep, which may affect the size of opening 114, as discussed in further detail below.

In different embodiments, upper 102 may have a variety of different configurations. In particular, upper 102 may have any design, shape, size, and/or color. For example, in the exemplary embodiment, article 100 is a basketball shoe and so, therefore, upper 102 may have a high-top configuration that is shaped to provide high support on an ankle. In other embodiments, however, upper 102 could be configured as a low-top upper for running or other activities.

Upper 102 and sole structure 110 may be attached in any manner. Embodiments can utilize any known methods for securing a sole structure to an upper, including various lasting techniques such as board-lasting, slip-lasting, combination-lasting, or strobel-lasting techniques. In FIG. 1, bite line 125 is the location along the periphery of article 100 where upper 102 meets and/or joins to sole structure 110.

Figure 2:
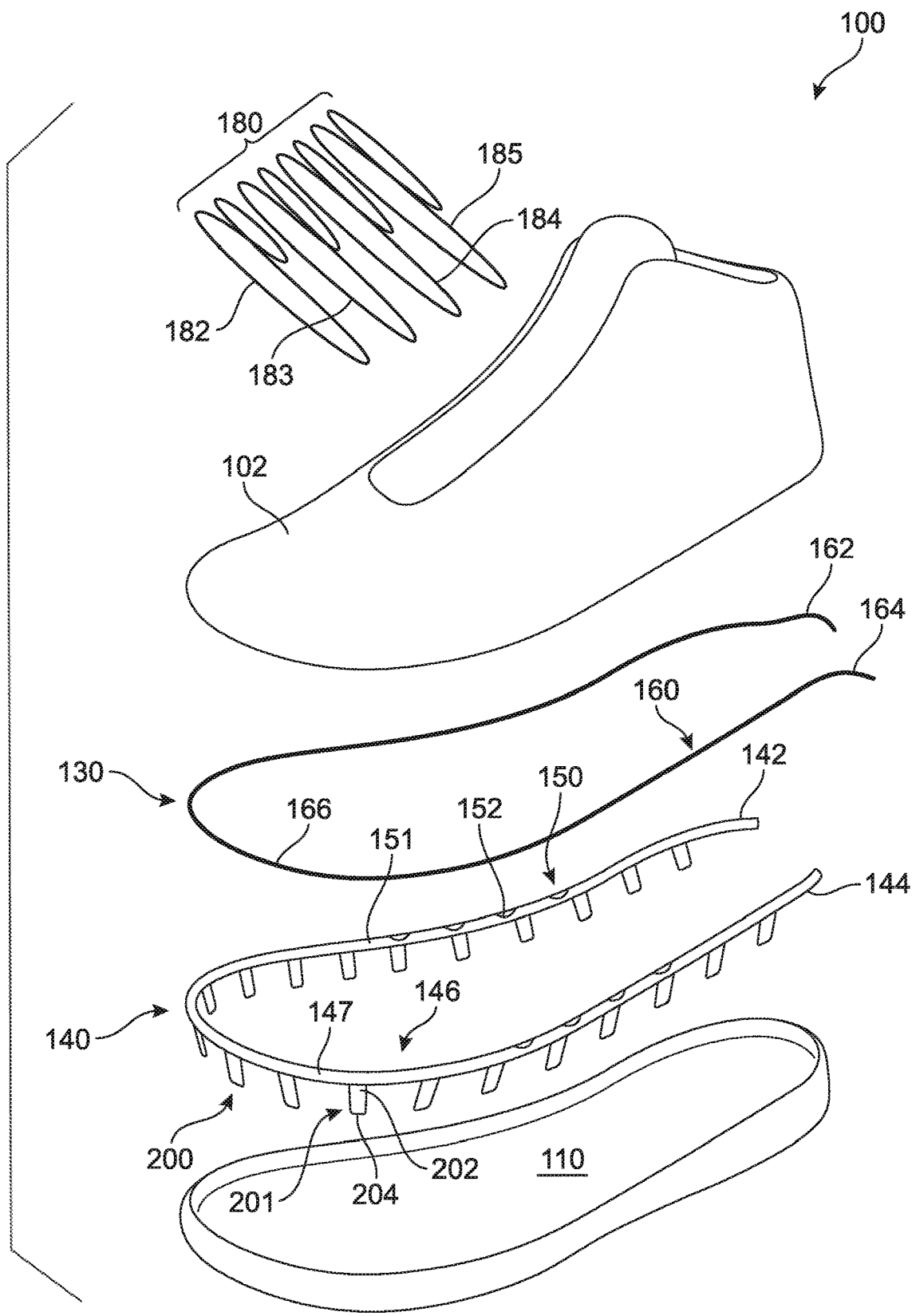
FIG. 2 is a schematic exploded isometric view of the article of footwear of FIG. 1.

FIG. 2 illustrates an exploded isometric view of an embodiment of article of footwear 100, including various components. Referring to FIGS. 1-2, article 100 may be provided with tensioning system 130. Tensioning system 130 may further include tubular structure 140, first tensile strand 160, and a plurality of secondary tensile strands 180.

As used herein, the term "tubular structure" refers to any elongated structure with length greater than width and thickness (or diameter for rounded geometries), which further includes an internal tunnel or cavity through its length. In this detailed description and in the claims, the term tubular structure is not intended to be limited to structures with rounded inner and outer cross-sectional geometries. In other words, tubular structures could have outer cross-sectional geometries that are approximately rectangular or polygonal, ovoid or other geometries that need not be circular or approximately circular. In the exemplary embodiment of FIG. 1, tubular structure 140 may generally comprise an elongated structure, which further includes tunnel 141. Tubular structure 140 may further have a cross-sectional geometry that includes rounded section 161, which faces outwardly from article 100, and flattened section 163, which is generally disposed against upper 102.

Tubular structure 140 may further include first end 142, second end 144, and intermediate portion 146 that is disposed between first end 142 and second end 144. Intermediate portion 146 need not extend the full length between first end 142 and second end 144, and may generally characterize a region or segment of tubular structure 140 between first end 142 and second end 144. Tunnel 141 of tubular structure 140 may extend continuously through the entire length of tubular structure 140, from first end 142 to second end 144. Of course, it is contemplated that in other embodiments, tunnel 141 need not extend all the way to first end 142 or second end 144 of tubular structure 140.

Tubular structure 140 may be configured with one or more openings in a surface or sidewall of tubular structure 140. In FIGS. 1-2, tubular structure 140 includes plurality of openings 150. For example, as shown in FIG. 2, first opening 152, which may be representative of plurality of openings 150, is disposed in outer surface 143 of tubular structure 140. First opening 152 may further extend to tunnel 141. In other words, first opening 152 extends from outer surface 151 to inner surface 153 (shown in FIG. 1) of tubular structure 140. It will be understood that each of the remaining openings in plurality of openings 150 may likewise extend from outer surface 143 to tunnel 141. Thus, plurality of openings 150 may provide an access point for components (such as tensile strands) to enter or exit tunnel 141. Although not shown in the Figures, first end 142 and second end 144 of tubular structure 140 may likewise include openings that allow for access to tunnel 141.

The embodiment shown in FIGS. 1-2 has a common orientation for plurality of openings 150 along tubular structure 140. Specifically, each of the plurality of openings 150 is generally oriented toward an instep of article 100. However, other opening orientations are possible, and in some embodiments different holes could be configured with different orientations.

In different embodiments, one or more dimensions of a tubular structure, as well as the tunnel and openings formed in the tubular structure, could vary. For example, in different embodiments, the outer diameter of a tubular structure could have any value in the range between 0.1 mm and 2 cm. Likewise, the tube thickness, characterized by the distance between the outer surface and inner surface (e.g., outer surface 151 and inner surface 153) could have any value in the range between 0.5 mm and 1.8 cm. It may be appreciated that the tunnel diameter may vary in accordance with the tube thickness (i.e., the tunnel diameter is the diameter of the tubular structure minus twice the tube thickness). Moreover, the diameter and tube thickness for a tubular structure may be selected according to various factors including desired tensile strand diameter, desired flexibility of the tubular structure, desired height of the tubular structure relative to the upper as well as possibly other factors.

Additionally, the number and arrangement of openings could vary. For example, some embodiments may include only a single opening, while others could include between two and 50 openings. Still other embodiments could include more than 50 openings. The number of openings could be selected according to the number of access points to a tunnel required, as well as the desired flexibility of a tubular structure, as additional openings may increase the flexibility of the tubular structure proximate the openings. It may also be appreciated that the openings could be disposed uniformly through the tubular structure, or in any discrete groups or patterns.

The sizes of openings could vary. For example, a circumferential dimension of an opening may characterize how much of the circumference of a tubular structure that the opening covers. Some embodiments can include openings with a circumferential dimension of only a few percent of the total circumference of the tubular structure. Still other embodiments could include openings with a circumferential dimension having a value between 20 and 80 percent of the circumference of the tubular structure. For example, in other embodiments, openings could be large enough so that only a narrow section of the tubular structure connects adjacent portions of the tubular structure at the opening.

A tubular structure can be configured with various physical properties. Exemplary physical properties of the tubular structure that could be varied include rigidity, strength, and flexibility or elasticity. In some embodiments, for example, a tubular structure could be configured as relatively rigid with little flexibility. In the embodiment of FIGS. 1-2, tubular structure 140 may be configured with some flexibility such that one or more portions of tubular structure 140 can undergo elastic deformation during tensioning.

Different embodiments could utilize different materials for a tubular structure. Exemplary materials may include, but are not limited to, various kinds of polymers. In embodiments where a tubular structure may be formed by a 3D printing process, the tubular structure could be made of materials including, but not limited to, thermoplastics (e.g., PLA and ABS) and thermoplastic powders, high-density polyurethane, eutectic metals, rubber, modeling clay, plasticine, RTV silicone, porcelain, metal clay, ceramic materials, plaster and photopolymers, as well as possibly other materials known for use in 3D printing. Such materials may be herein referred to as "printable materials."

Tensioning system 130 includes first tensile strand 160 and plurality of secondary tensile strands 180. As used herein, the term "tensile strand" refers to any elongated (e.g., approximately two dimensional) element capable of transferring tension across its length. Examples of various kinds of tensile strands that could be used with the embodiments include, but are not limited to, cords, laces, wires, cables, threads, ropes, filaments, yarns as well as possibly other kinds of strands. Tensile strands may be configured with different strengths as well as different degrees of stretch or elasticity.

First tensile strand 160 may comprise a cord-like element having an approximately rounded cross section. First tensile strand 160 includes first end portion 162, second end portion 164, and intermediate portion 166. Although the length of first tensile strand 160 could vary from one embodiment to another, in an exemplary embodiment, first tensile strand 160 may be longer than tubular structure 140 so that first end portion 162 and second end portion 164 extend outwardly from first end 142 and second end 144, respectively, of tubular structure 140.

In some embodiments, first tensile strand 160 may include provisions to prevent either first end portion 162 or second end portion 164 from being pulled into tunnel 141 of tubular structure 140. Such an element may be herein referred to as a "catching element," though the exemplary embodiment of FIGS. 1-2 is not depicted with any catching elements. Catching elements could include knots formed in a tensile strand or other elements that clamp or tie onto the tensile strand. A catching element may generally have a cross-sectional size and/or shape that prevents the catching element from being pulled into a tubular structure. Instead, the catching element may press against the end of the tubular structure thereby allowing the other end of the tensile strand to be pulled so as to generate tension across the tensile strand.

Embodiments can include provisions for facilitating attachment of a tubular structure to one or more structures of an article of footwear (also referred to as "attachment structures"). In some embodiments, a tubular structure may include parts that extend away from a tubular portion of the tubular structure, which may be a portion forming a tunnel of the tubular structure. In some embodiments, a tubular structure may comprise one or more tab portions that extend away from a tubular portion, or tunnel portion, of the tubular structure.

In the embodiment shown in FIG. 2, intermediate portion 146 of tubular structure 140 may include plurality of tab portions 200. Plurality of tab portions 200 may be integral with, and extend away from, tubular portion 147 of intermediate portion 146. For example, tab portion 201 of plurality of tab portions 200 includes first end 202 that is integral with tubular portion 147 and second end 204 that is distal to (and spaced away from) tubular portion 147.

Tab portions may be configured in a variety of different shapes and/or sizes. The embodiment of FIG. 2 depicts tab portions having a generally rectangular cross-sectional shape; however, other embodiments could be configured with any cross-sectional shapes including, but not limited to, semi-circular shapes, triangular shapes, regular shapes, and/or irregular shapes. In addition, one or more dimensions of a tab portion could vary. For example, a tab portion could be configured with a length (i.e., a dimension extending perpendicular to a tubular portion) in a range approximately between 1 percent and 25 percent of a length of the tubular structure. In still other embodiments, a tab portion could have a length in a range approximately between 0.1 percent and 1 percent of a length of the tubular structure. It may be appreciated that the shape and/or size of a tab portion may be selected to achieve a predetermined surface area for attaching the tab portion to an attachment structure of the article of footwear. Moreover, the shape and/or size could be selected according to the type and/or location of an attachment structure.

As discussed in further detail below, tab portions may be attached to various kinds of attachment structures on an article of footwear. Exemplary attachment structures include, but are not limited to, portions of an upper, portions of a sole structure, heel counters, toe guards, heel cups, ankle guards, support pads, mesh panels, tongues, eyestays (or lace stays), eyelets, straps, laces, as well as other kinds of structures. In some embodiments, a bite line may be an attachment structure, as it comprises adjacent portions of an upper and a sole structure.

Referring to FIGS. 1-2, plurality of secondary tensile strands 180 includes four secondary tensile strands (or just "tensile strands"). Specifically, as seen in FIGS. 1-2, plurality of secondary tensile strands 180 includes second tensile strand 182, third tensile strand 183, fourth tensile strand 184, and fifth tensile strand 185. In other embodiments, tensioning system 130 could include fewer than four secondary tensile strands. In still other embodiments, tensioning system 130 could include more than four secondary tensile strands.

In different embodiments, two or more tensile strands could vary in one more properties. In some embodiments, a first tensile strand and a second tensile strand could be substantially similar in materials and/or dimensions. In other embodiments, however, a first tensile strand and a second tensile strand could differ in material and/or dimensions. For example, the exemplary embodiment depicts first tensile strand 160 that is much longer than any of the plurality of secondary tensile strands 180. Further, first tensile strand 160 may have a larger diameter than second tensile strand 182, which is a representative tensile strand of plurality of secondary tensile strands 180. In particular, in some embodiments, each of the tensile strands of plurality of secondary tensile strands 180 may have a similar diameter.

In some embodiments, first tensile strand 160 may also be made of a different material than second tensile strand 182.

For example, in some embodiments, first tensile strand 160 could be made of nylon, while second tensile strand 182 could be made of a high-strength material such as Vectran. Using this combination of materials could allow for slightly more give and durability in first tensile strand 160, which may be subjected to stresses in many different directions. In other embodiments, however, first tensile strand 160 and second tensile strand 182 could be made of similar materials that impart similar physical properties including similar strength, stretch, and durability.

Optionally, in some embodiments, a tensile strand may be encased in a coating, such as a PTFE coating, that allows the tensile strand to be pulled or pushed smoothly through a tunnel and/or against a surface such as an upper with minimal resistance. It is also contemplated that in some other embodiments, some portions of plurality of secondary tensile strands 180 could be laminated, covered, or embedded within a layer of TPU or other polymer material that may help bond plurality of secondary tensile strands 180 to an upper along their lengths.

Referring to FIG. 1, in the assembled article 100, tubular structure 140 extends along bite line 125 on outer surface 105 of upper 102. Specifically, first end 142 of tubular structure 140 (see FIG. 2) begins in heel portion 14 on medial side 18, extends through midfoot portion 12 and forefoot portion 10 on medial side 18 and then crosses to lateral side 16 at the front of article 100. From the front on lateral side 16, tubular structure 140 extends through forefoot portion 10 and midfoot portion 12, and into heel portion 14 on lateral side 16. Second end 144 is disposed in heel portion 14.

In some embodiments, each secondary tensile strand may comprise a loop-like strand or element that wraps over the top, or instep, of upper 102. Moreover, each secondary tensile strand includes a portion engaged with first tensile strand 160 and provide a means of transferring tension between first tensile strand 160 and one or more other regions of article 100 (e.g., transferring tension across the instep of upper 102).

A tubular structure may be secured to an article using a variety of different provisions. In embodiments including tubular structures with tubular portions and tab portions that extend from the tubular portions, the tubular portions and/or the tab portions could be attached to one or more structures of an article. For example, in some embodiments, a tubular portion could be attached to an upper. In other embodiments, a tab portion could be attached to an upper and/or to another structure of an article. In still other embodiments, a tubular portion and one or more tab portions could be attached to an upper and/or other structures of an article.

As used herein, "attachment" between a portion of a tubular structure and a portion of an article can include any of a variety of different means of attachment. Examples of attachment means include, but are not limited to, direct bonding (i.e., bonding between compatible materials such as a textile being bonded with a suitable polymer material using heat and/or pressure), adhesives, as well as other means of attachment known in the art. In some embodiments, a tubular portion and/or a tab portion could be attached to an upper, sole structure, or other component during a three-dimensional printing process, in which the portions are printed as three-dimensional structures onto the article and bond with a portion of the article as the print material cools and/or cures. Some exemplary means of attachment are discussed in further detail below and shown in FIGS. 6-7.

Figure 3:
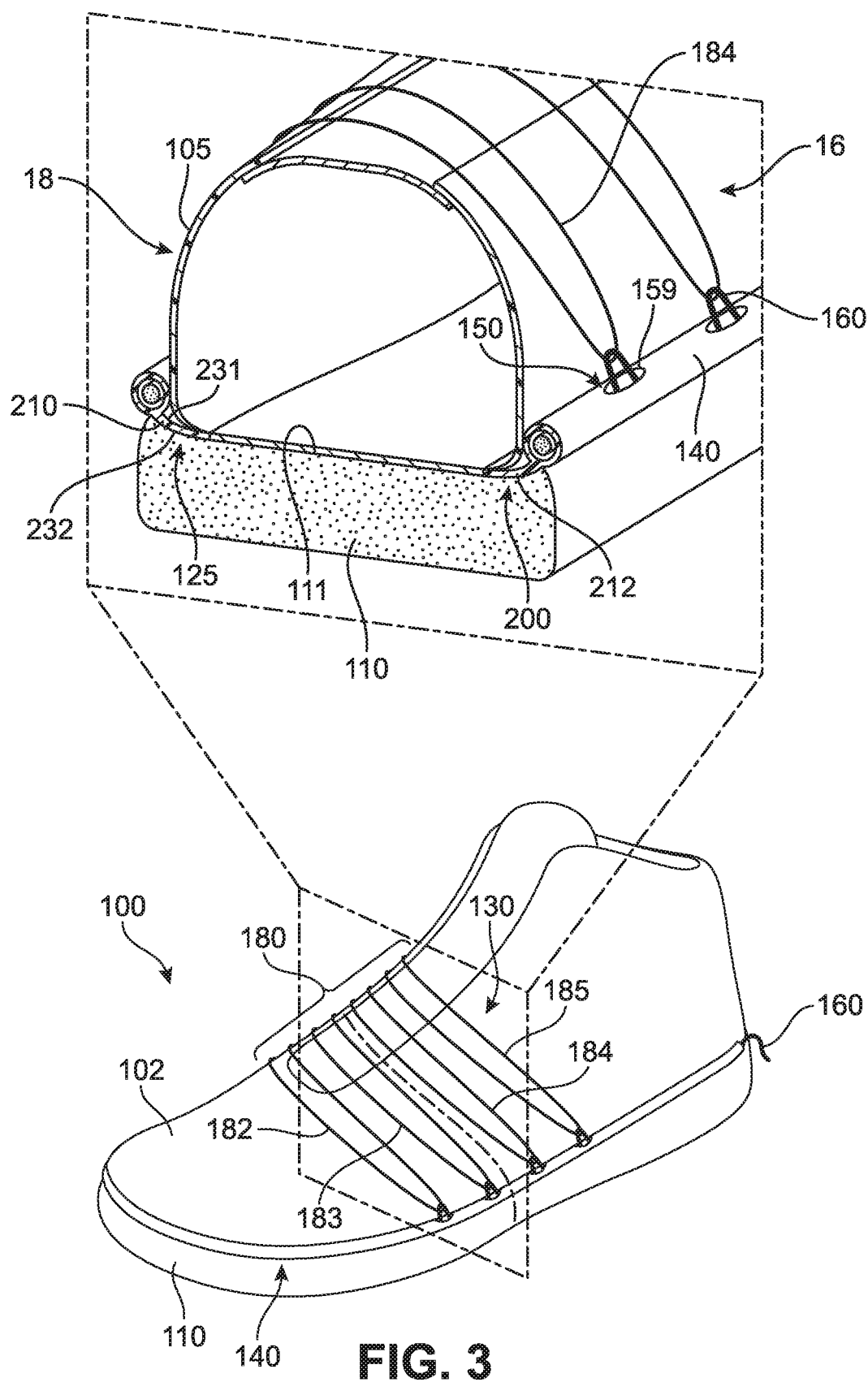
FIG. 3 is a schematic isometric view of the article of footwear of FIG.1 including an enlarged cross-sectional view.
Figure 4:
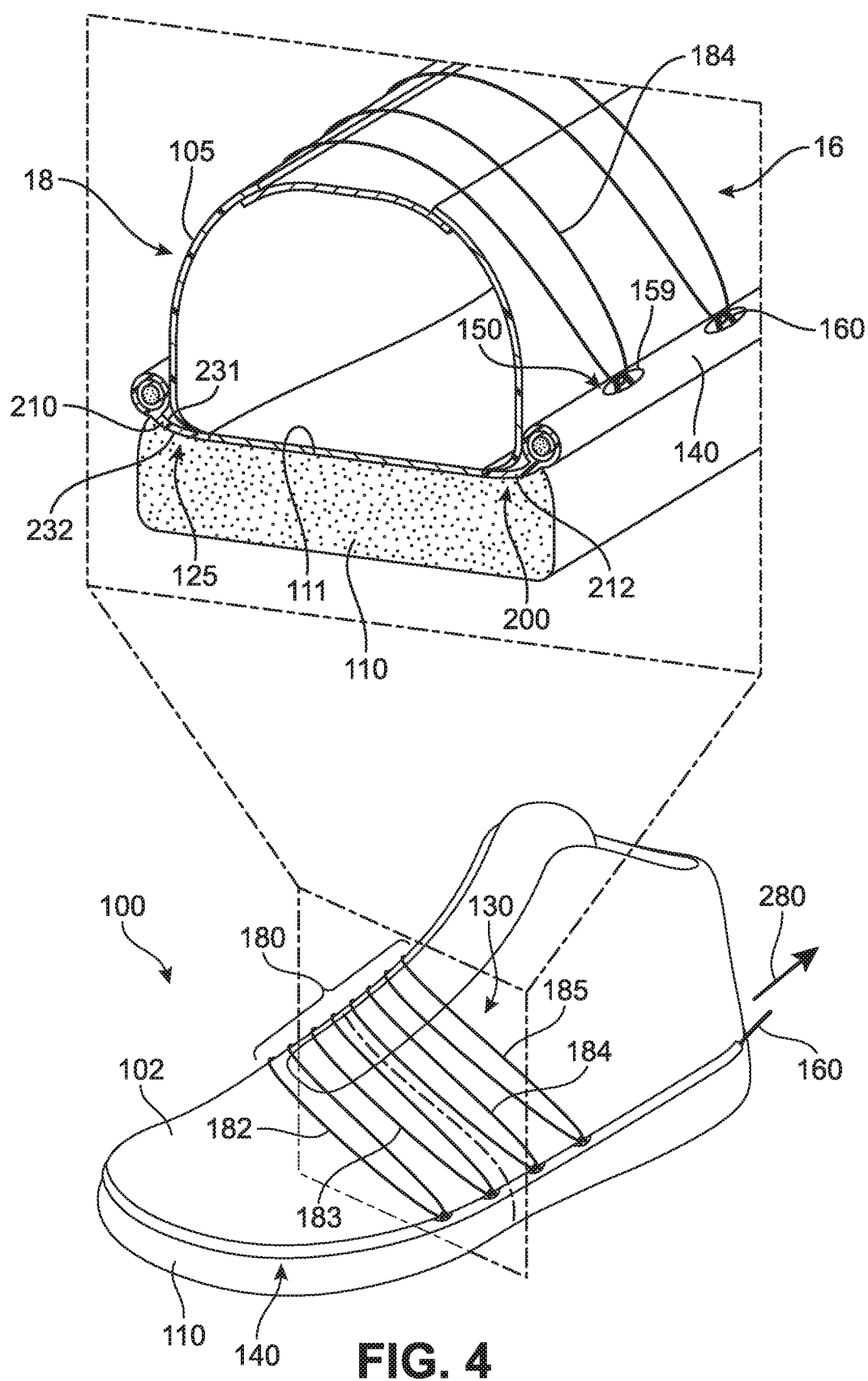
FIG. 4 is a schematic isometric view of the article of footwear of FIG.1 including an enlarged cross-sectional view, in which tension is applied across a tensile strand.
Figure 5:
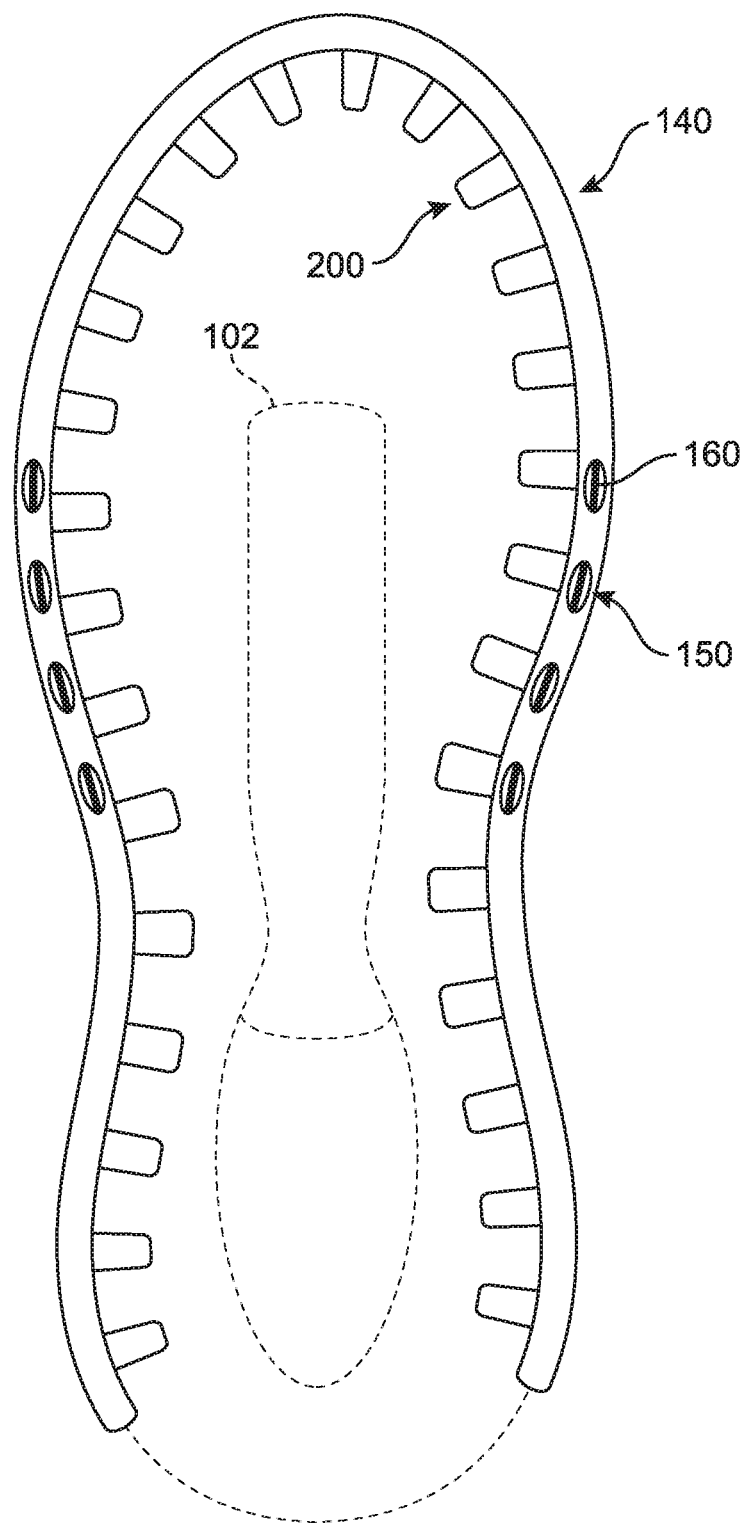
FIG. 5 is a top-down view of the article of footwear of FIG. 1, in which the upper is shown in phantom.

FIGS. 3-4 illustrate schematic isometric views of article 100, including enlarged cutaway views of article 100. Referring to FIGS. 3-4, plurality of tab portions 200 may be attached to article 100 at bite line 125. For example, a tab portion 210 of plurality of tab portions 200 may be disposed between sole structure 110 and upper 102 on medial side 18. Likewise, tab portion 212 of plurality of tab portions 200 may be disposed between sole structure 110 and upper 102 on lateral side 16. Similarly, the remaining plurality of tab portions 200 may be disposed between sole structure 110 and upper 102, as shown in FIG. 5, which illustrates a top-down schematic view of article 100 with upper 102 shown in phantom.

In attaching to article 100 at bite line 125, each tab portion may engage with surfaces of upper 102 and/or sole structure 110. As seen in FIG. 3, tab portion 210 includes first surface 231 in contact with outer surface 105 of upper 102 and second surface 232 in contact with interior surface 111 of sole structure 110. Similarly, each tab portion of plurality of tab portions 200 may likewise include opposing surfaces in contact with outer surface 105 of upper 102 and with interior surface 111 of sole structure 110, respectively.

In some embodiments, each tab portion could be secured both to upper 102 and to sole structure 110 (i.e., to outer surface 105 of upper 102 and to interior surface 111 of sole structure 110). However, in other embodiments a tab portion could be attached to only one of upper 102 and sole structure 110. For example, in another embodiment, a first surface of a tab portion could be attached to upper 102, while a second opposing surface may not be attached to sole structure 110 even though the second opposing surface may be adjacent to and/or in contact with sole structure 110. In another embodiment, a first surface of a tab portion could be attached to sole structure 110, while a second opposing surface may not be attached to upper 102 even though the second opposing surface may be adjacent to and/or in contact with upper 102.

By attaching plurality of tab portions 200 at bite line 125 of article 100, plurality of tab portions 200 may anchor tubular structure 140 in place along bite line 125. Such an arrangement may help keep tubular structure 140 from moving away from bite line 125. In contrast, for example, in embodiments where tubular structure 140 is secured to a side portion of upper 102, the tubular structure may change its absolute position on article 100 as upper 102 is deformed (e.g., stretched or compressed) under tensions applied through tensioning system 130.

FIGS. 3-4 also illustrate how tension applied to first tensile strand 160 may transmit tension to plurality of secondary tensile strands 180, and ultimately across portions of upper 102. In a relaxed state, shown in FIG. 3, plurality of secondary tensile strands 180 may pull some portions of first tensile strand 160 out of plurality of openings 150 in tubular structure 140. In FIG. 4, tensioning force 280 is applied to the ends of first tensile strand 160, resulting in a tensioned or tightened state for tensioning system 130. This results in first tensile strand 160 being pulled taut within tubular structure 140. As first tensile strand 160 is pulled taut, plurality of secondary tensile strands 180 are pulled into plurality of openings 150 (e.g., second tensile strand 182 is pulled into opening 159). Thus, tension is created across plurality of secondary tensile strands 180, which results in a tightening of upper 102. Moreover, plurality of tab portions 200 may act to keep tubular structure 140 from moving toward the instep of upper 102, which is the direction that plurality of secondary tensile strands 180 will tend to pull first tensile strand 160 and tubular structure 140. Such a configuration may, therefore, help ensure tension applied along first tensile strand 160 is used to tighten upper 102, rather than moving tubular structure 140 along upper 102.

Various other arrangements of secondary tensile strands are possible in other embodiments. In some embodiments, tensile strands may extend from a tubular structure to a bite line. In other embodiments, tensile strands could extend between two different portions of a tubular structure, or between two separate tubular structures. Moreover, some embodiments can be configured with a combination of tensile strands that extend to the bite line or across the upper to other portions of a tubular structure. In still other embodiments, one or more portions of a secondary tensile strand could be attached directly to a portion of an upper using, for example, a laminate layer to bond the tensile strand to the upper, or using various kinds of welds.

Figure 6:
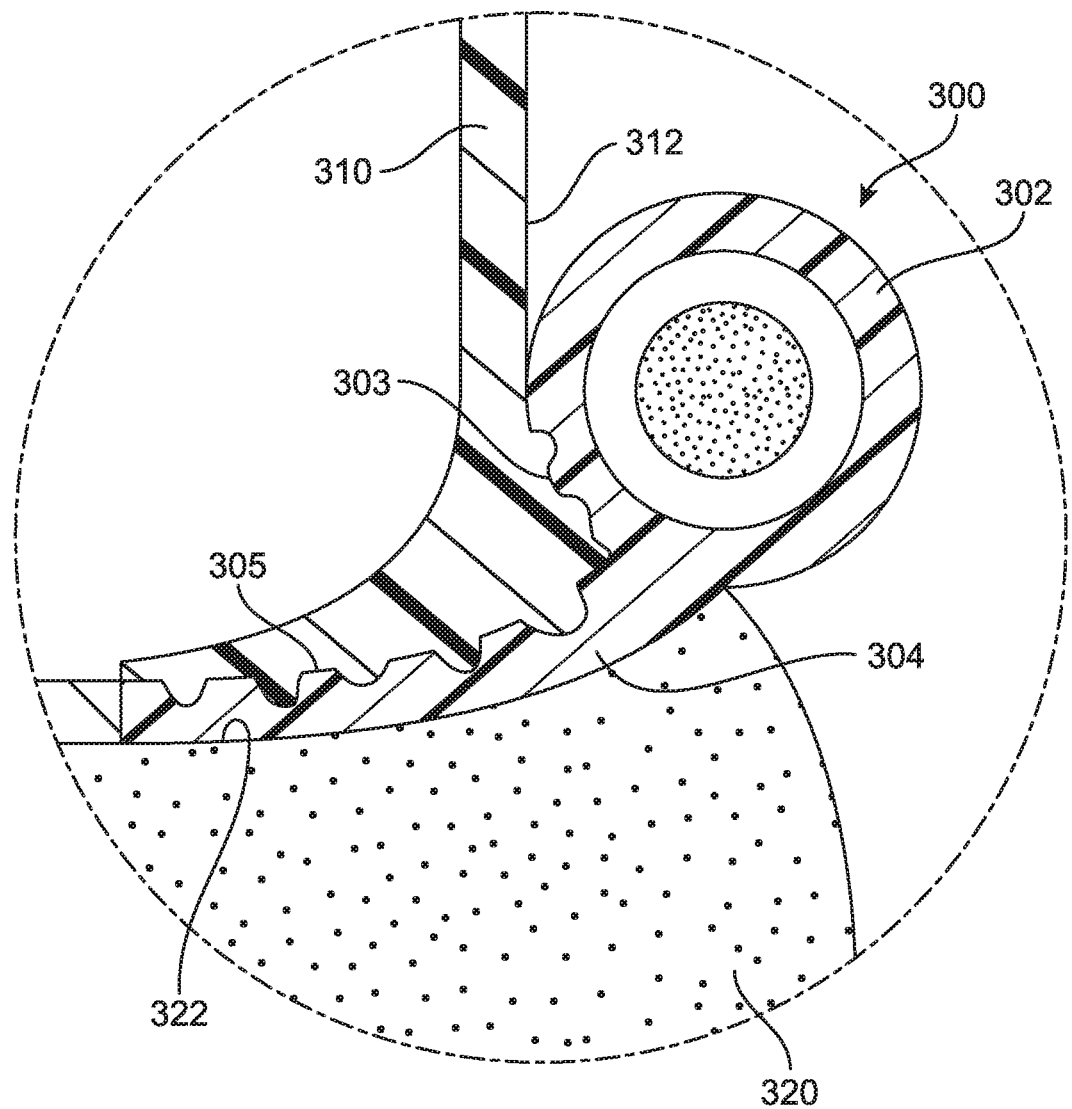
FIG. 6 is a schematic enlarged cross-sectional view of a portion of an article of footwear with a tubular structure having a tab portion, according to an embodiment.

The embodiments can utilize various different methods for attaching tab portions to an article of footwear. FIG. 6 depicts an enlarged cross-sectional view of an embodiment in which a tab portion is directly bonded to a surface of an upper. Referring to FIG. 6, tubular structure 300 comprises tubular portion 302 and tab portion 304. Tab portion 304 may extend between inner surface 322 of sole structure 320 and outer surface 312 of upper 310. In the embodiment of FIG. 6, surface 305 of tab portion 304 is bonded directly to outer surface 312 of upper 310. Specifically, tab portion 304 may include a material that bonds directly to a material comprising part of upper 310. As an example, tab portion 304 could include a printable material that is printed (or otherwise deposited) onto outer surface 312 and which bonds with outer surface 312.

In embodiments where direct bonding occurs between a tab portion and a structure, such as an upper, such direct bonding may also occur between a tubular portion and the structure (e.g., the upper). For example, as seen in the embodiment of FIG. 6, portion 303 of tubular portion 302 may be also directly bonded to outer surface 312 of upper 310. Thus, it may be appreciated that, in some embodiments, tab portions may provide additional surface area for attaching a tubular structure to an upper or other structure of an article of footwear and may not be the only means of attachment for a tubular structure. Alternatively, in some other embodiments, only the tab portions could be directly bonded to an upper or other structure, and the tubular portions of the tubular structure could be detached from the upper.

Figure 7:
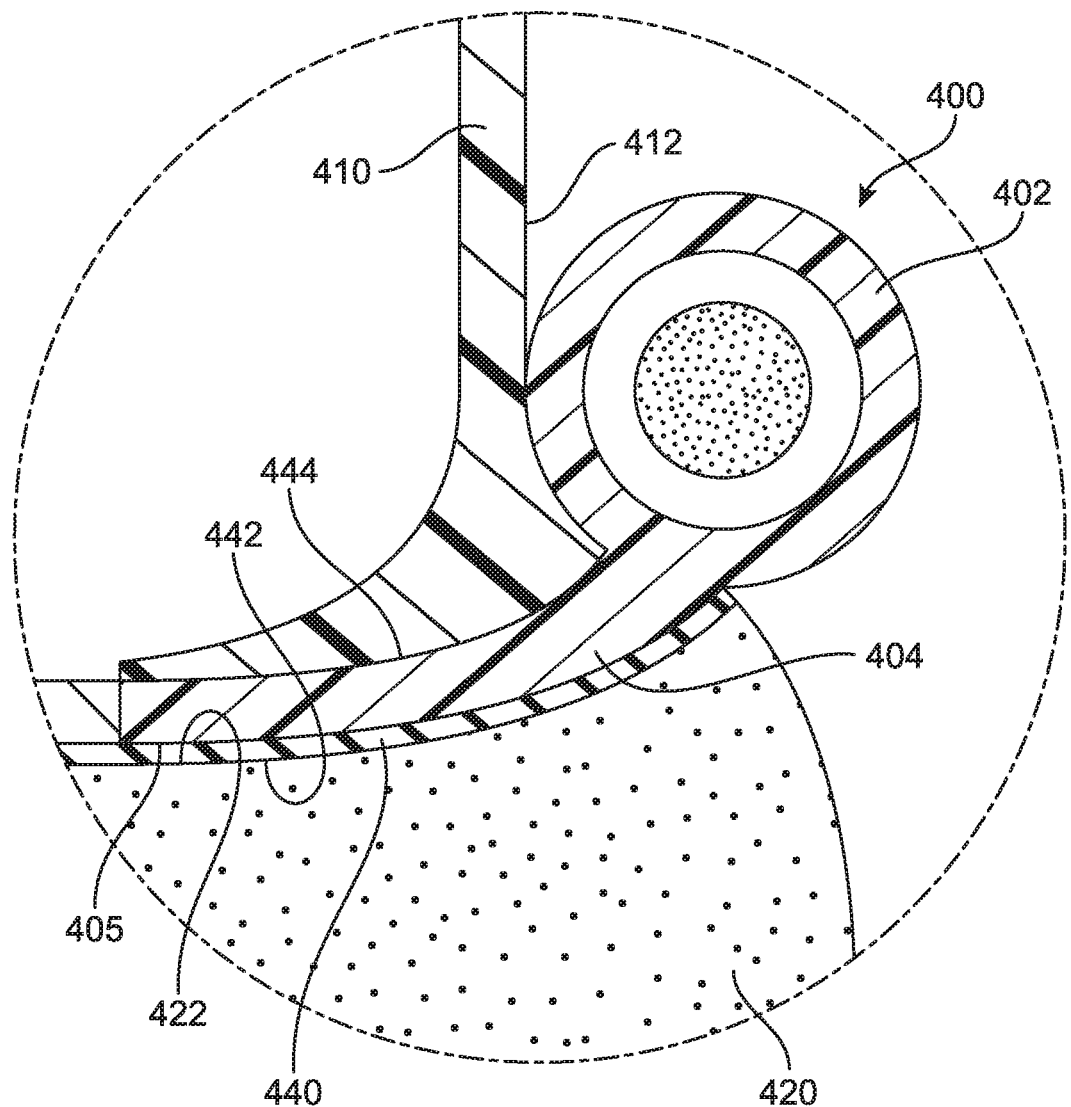
FIG. 7 is a schematic enlarged cross-sectional view of a portion of an article of footwear with a tubular structure having a tab portion, according to another embodiment.

FIG. 7 depicts an enlarged cross-sectional view of an embodiment in which a tab portion is attached to a sole structure using an adhesive layer. Referring to FIG. 7, tubular structure 400 comprises tubular portion 402 and tab portion 404. Tab portion 404 may extend between inner surface 422 of sole structure 420 and outer surface 412 of upper 410. In the embodiment of FIG. 7, surface 405 of tab portion 404 is attached to surface 444 of adhesive layer 440. Additionally, surface 442 of adhesive layer is attached to inner surface 422 of sole structure 420. In other words, the adhesive layer acts to attach tab portion 404 and sole structure 420. Moreover, in the embodiment of FIG. 7, tubular portion 402 is shown as being detached (not bonded) directly to outer surface 412 of upper 410, unlike in the embodiment shown in FIG. 6. Of course, in other embodiments, a tab portion could be attached to a sole structure using an adhesive layer and a tubular portion could be directly bonded to an outer surface of an upper.

Figure 8:
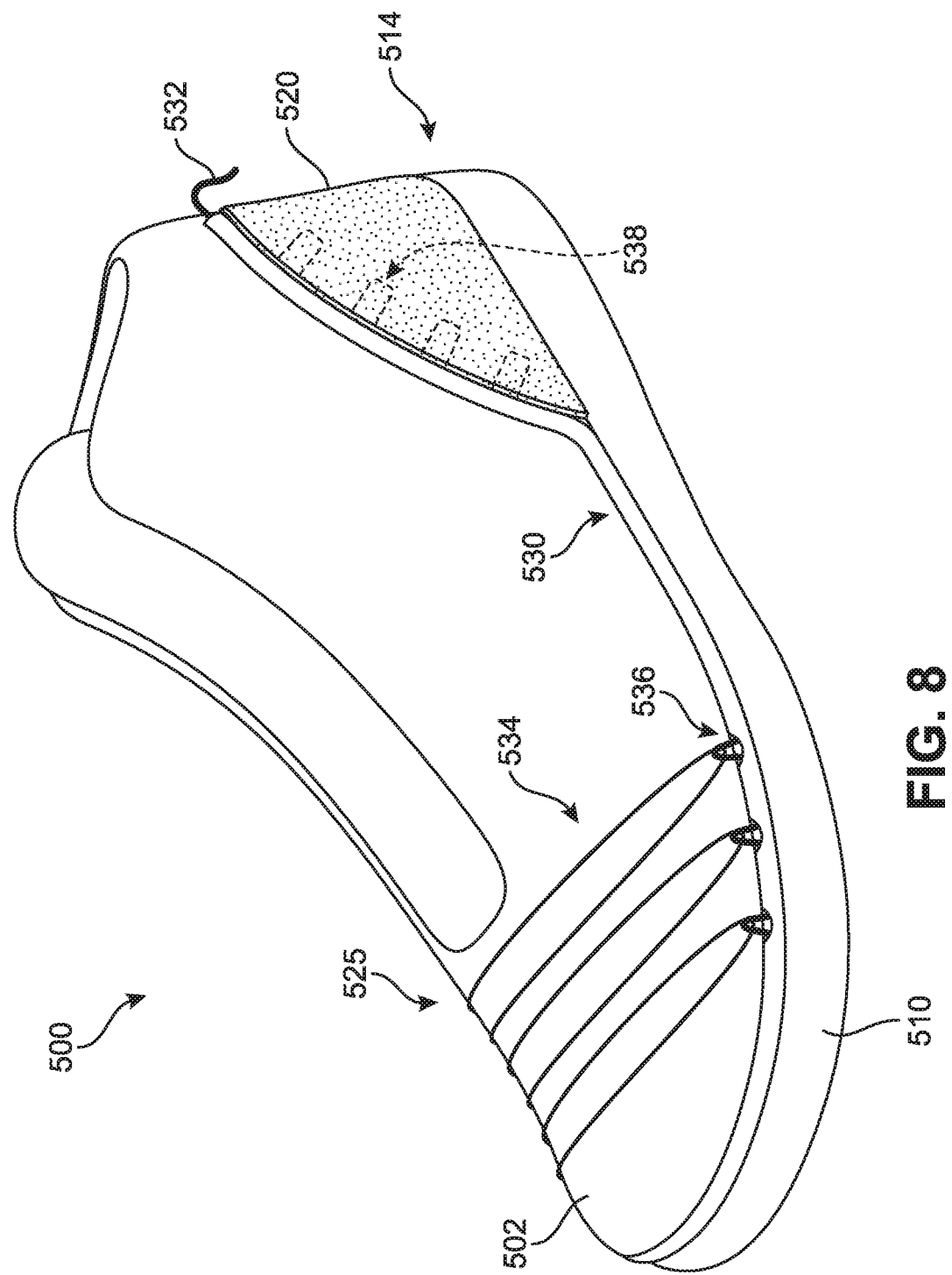
FIG. 8 is a schematic isometric view of an embodiment of an article of footwear including a tensioning system and heel counter.
Figure 9:
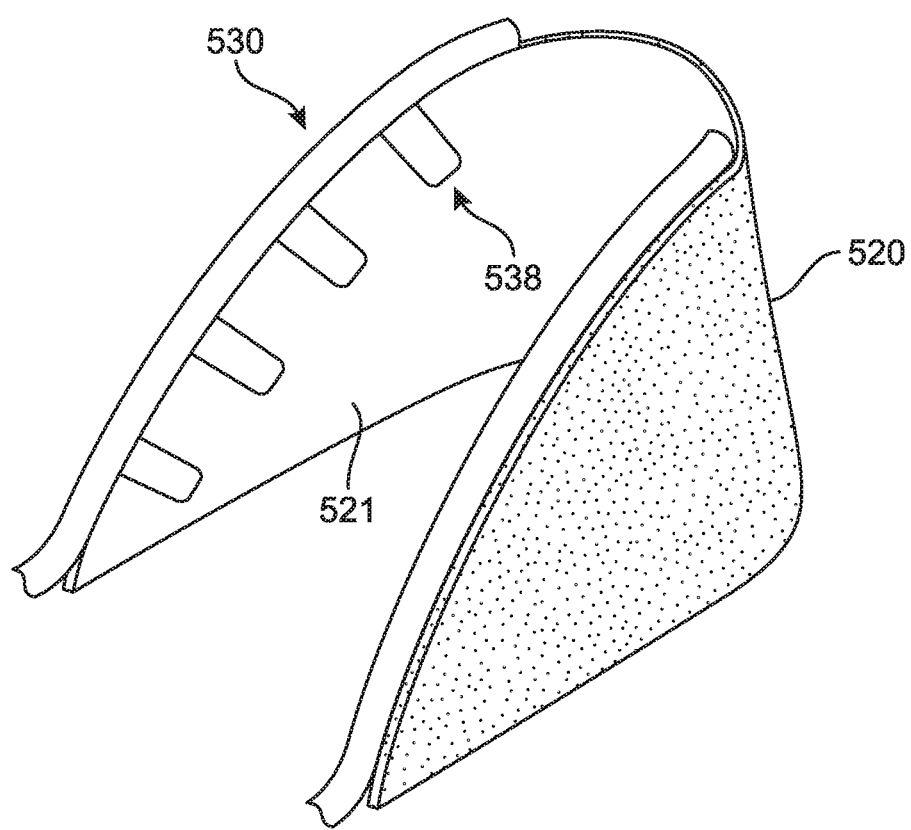
FIG. 9 is a schematic isometric view of the heel counter of FIG. 8 and a portion of a tubular structure attached to the heel counter.

Embodiments can include provisions for attaching a tubular structure to one or more structures on an article of footwear. Such structures could include heel counters, toe guards, eyestays, as well as possibly other structures. In an embodiment shown in FIGS. 8-9, article of footwear 500, or simply article 500, includes upper 502 and sole structure 510. Article 500 further includes external heel counter 520 in heel region 514.

Article 500 includes tensioning system 525, which further includes tubular structure 530, primary tensile strand 532, and plurality of secondary tensile strands 534. Primary tensile strand 532 engages with plurality of secondary tensile strands 534 proximate openings 536.

In order to secure tubular structure 530 in heel region 514 of article 500, tubular structure 530 includes plurality of tab portions 538 that are attached directly to external heel counter 520. In some embodiments, plurality of tab portions 538 could be attached directly to interior surface 521 of external heel counter 520 (see FIG. 9). In such cases, plurality of tab portions 538 may be inserted between external heel counter 520 and an outer surface of upper 502. In other embodiments, of course, one or more tab portions could be attached to an external surface of external heel counter 520.

Attaching a tubular structure (via tab portions) to a heel counter may help to anchor some portions of the tubular structure in place, thereby minimizing movement of the tubular structure in the heel portion.

Figure 10:
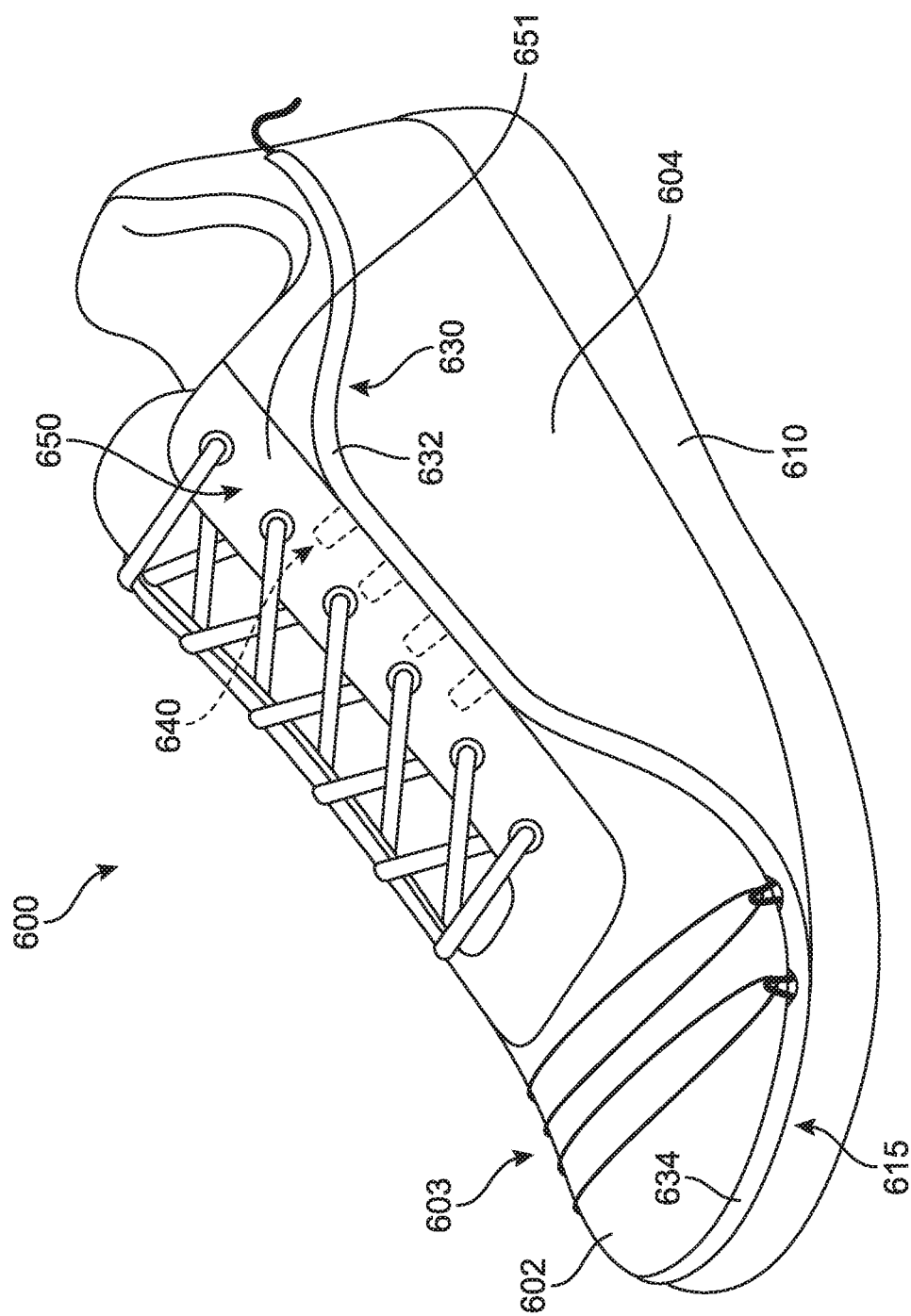
FIG. 10 is a schematic isometric view of an embodiment of an article of footwear with a tensioning system.

In another embodiment, depicted in FIG. 10, article 600 includes upper 602, sole structure 610, and tubular structure 630. Tubular structure 630 may include plurality of tab portions 640 that are engaged with eyestay 650. Specifically, first tubular portion 632 of tubular structure 630 may be disposed adjacent an edge of eyestay 650. Plurality of tab portions 640 may extend from first tubular portion 632 and engage eyestay 650. Second tubular portion 634, disposed in forefoot portion 603 of article 600 may be disposed adjacent bite line 615. In some cases, additional tab portions (not shown) may be engaged with upper 602 and/or sole structure 610 at bite line 615.

In some embodiments, plurality of tab portions 640 may be attached directly to eyestay 650. In the embodiment of FIG. 10, plurality of tab portions 640 may be attached to an inner surface of eyestay 650, which is in contact with outer surface 604 of upper 602. Furthermore, plurality of tab portions 640 could be disposed between outer surface 604 of upper 602 and an inner surface of eyestay 650. Alternatively, in another embodiment, plurality of tab portions 640 could be attached to outer surface 651 of eyestay 650, which is disposed opposite of an inner surface.

As previously discussed, tab portions may be attached to structures (e.g., a heel counter or an eyestay) using any known methods, including direct bonding, using adhesives, as well as possibly other methods of attachment. The attachment method could be selected according to various factors including the material composition of the tab portions and attachment structures, as well as manufacturing considerations (e.g., manufacturing costs).

Embodiments can include provisions for accommodating multiple tensile strands within a tunnel of a tubular structure. In some embodiments, a tunnel of a tubular structure may be configured to receive at least two tensile strands. In still other embodiments, a tunnel of a tubular structure could be configured to receive three or more tensile strands.

Figure 11:
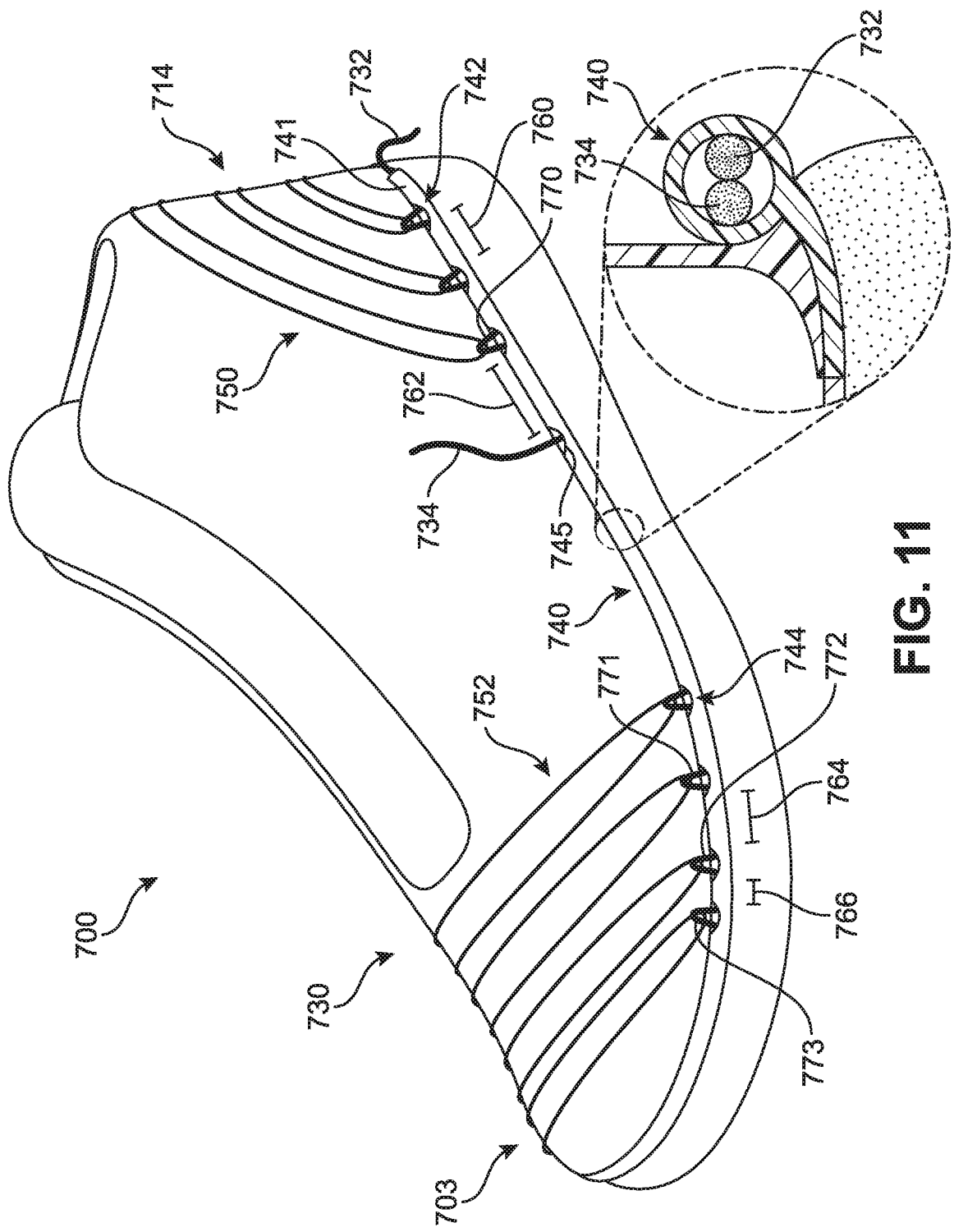
FIG. 11 is a schematic isometric view of an embodiment of an article of footwear with a tensioning system.

FIG. 11 illustrates an embodiment of article of footwear 700, or simply article 700, with tensioning system 730 that incorporates multiple tensile strands within tubular structure 740. In order to control tension at first set of secondary tensile strands 750 in heel portion 714, first tensile strand 732 may extend through tubular structure 740 and engage first set of secondary tensile strands 750 by way of first plurality of openings 742. Here, first tensile strand 732 may enter/exit tubular structure 740 through openings at ends 741 of tubular structure 740. By applying tension along first tensile strand 732, tension may be applied along first set of secondary set of tensile strands 750, and thus through heel portion 714.

In addition, in the embodiment of FIG. 11, a second set of second tensile strand 734 may be inserted into opening 745 on tubular structure 740. Here, opening 745 may be disposed in an intermediate portion of tubular structure 740, or, in other words, between ends 741 of tubular structure 740. Second tensile strand 734 may thus enter/exit tubular structure 740 at opening 745 on one side of article 700, as well as a similar intermediate opening (and/or an opening at an end) of tubular structure 740 on an opposing side of article 700 (not shown). In order to control tension at second set of secondary tensile strands 752, second tensile strand 734 may extend through tubular structure 740 and engage second set of secondary tensile strands 752 by way of second plurality of openings 744. By applying tension along second tensile strand 734, tension may be applied along second set of secondary tensile strands 752, and thus through forefoot portion 703.

Thus, the exemplary embodiment of FIG. 11 depicts a tensioning system that can be used to independently apply tension to two different portions or regions of an article.

In different embodiments, the spacing between openings could be regular and/or irregular. For example, the spacing between adjacent openings in first plurality of openings 742 in FIG. 11 may be approximately constant. Specifically, two adjacent openings may be spaced apart by distance 760 along tubular structure 740. In contrast, opening 770 in first plurality of openings 742 may be spaced distance 762 from opening 745, where distance 762 is greater than distance 760. Further, second plurality of openings 744 in forefoot portion 703 includes opening 771 and adjacent opening 772, which are spaced apart by distance 764, while opening 772 and adjacent opening 773 are spaced apart by distance 766 that is less than distance 764.

It may be appreciated that the spacing between adjacent openings on a tubular structure could be varied to accommodate a desired tensioning arrangement. Also, varying the number and spacing between holes may influence the degree to which a tubular structure deforms when tension is applied along a tensile strand.

Embodiments may include provisions for making an article with a tubular structure including tab portions. In some embodiments, a tubular structure may be formed and attached to an article using an additive manufacturing process, also referred to as three-dimensional printing (or simply "printing" hereafter).

Figure 12:
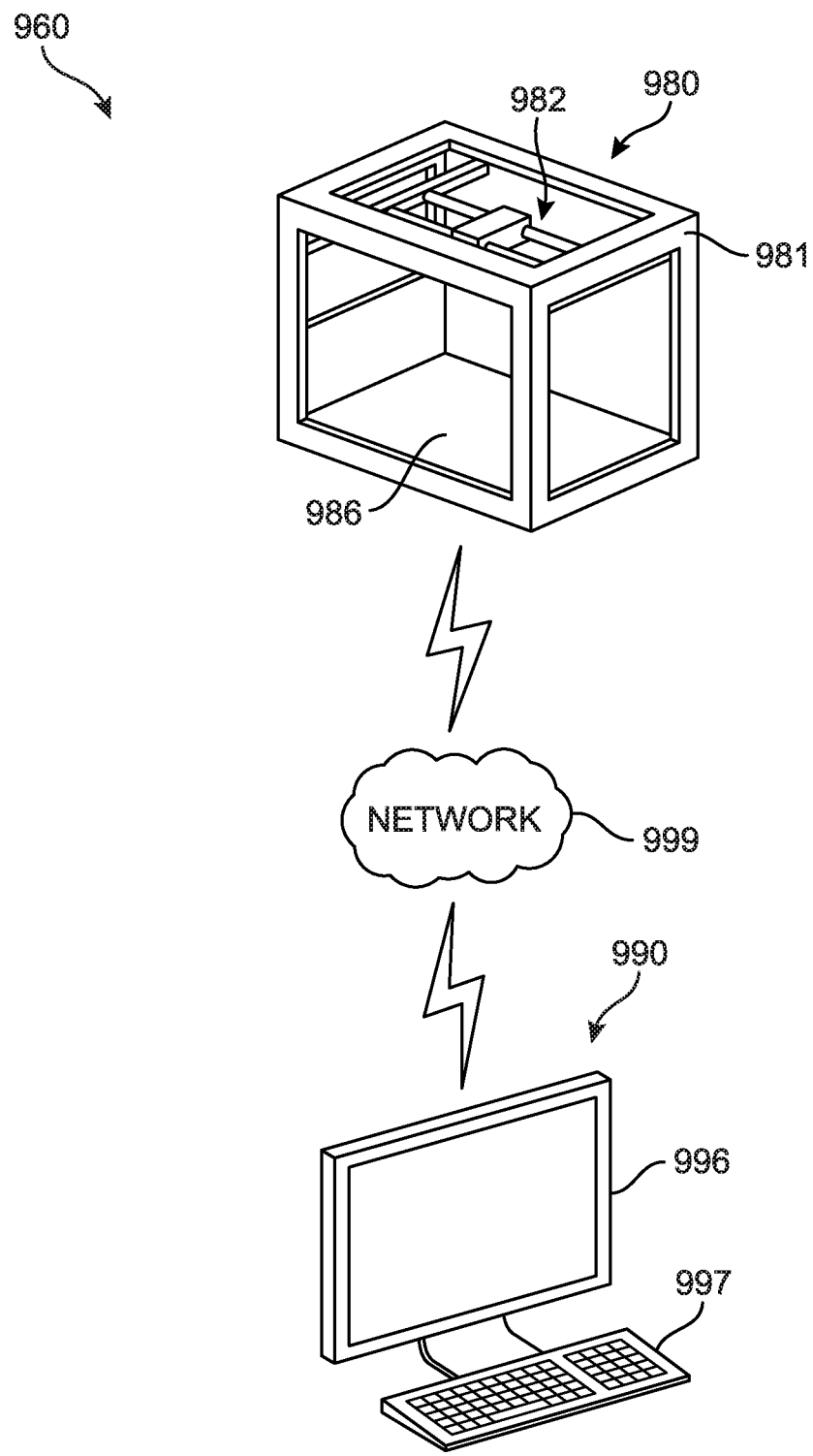
FIG. 12 is a schematic view of an embodiment of a printing system and computing system.

Referring to FIG. 12, manufacturing system 960 includes additive manufacturing device 980. The term "additive manufacturing," also referred to as "three-dimensional printing," refers to any device and technology for making a three-dimensional object through an additive process where layers of material are successively laid down under the control of a computer. Exemplary additive manufacturing techniques that could be used include, but are not limited to, extrusion methods such as fused deposition modeling (FDM), electron beam freeform fabrication (EBF), direct metal laser sintering (DMLS), electron beam melting (EBM), selective laser melting (SLM), selective heat sintering (SHS), selective laser sintering (SLS), plaster-based 3D printing, laminated object manufacturing (LOM), stereolithography (SLA), and digital light processing (DLP). In one embodiment, additive manufacturing device 980 could be a fused deposition modeling type printer configured to print thermoplastic materials such as acrylonitrile butadiene styrene (ABS) or polyactic acid (PLA).

An example of a printing device using fused filament fabrication (FFF) is disclosed in Crump, U.S. Pat. No. 5,121,329, filed Oct. 30, 1989 and titled "Apparatus and Method for Creating Three-Dimensional Objects," which application is herein incorporated by reference and referred to hereafter as the "3D Objects" application. Embodiments of the present disclosure can make use of any of the systems, components, devices, and methods disclosed in the 3D Objects application.

Additive manufacturing device 980 may be used to manufacture one or more components used in forming an article of footwear. For example, additive manufacturing device 980 may be used to form a tubular structure with tab portions on an upper.

Figure 13:
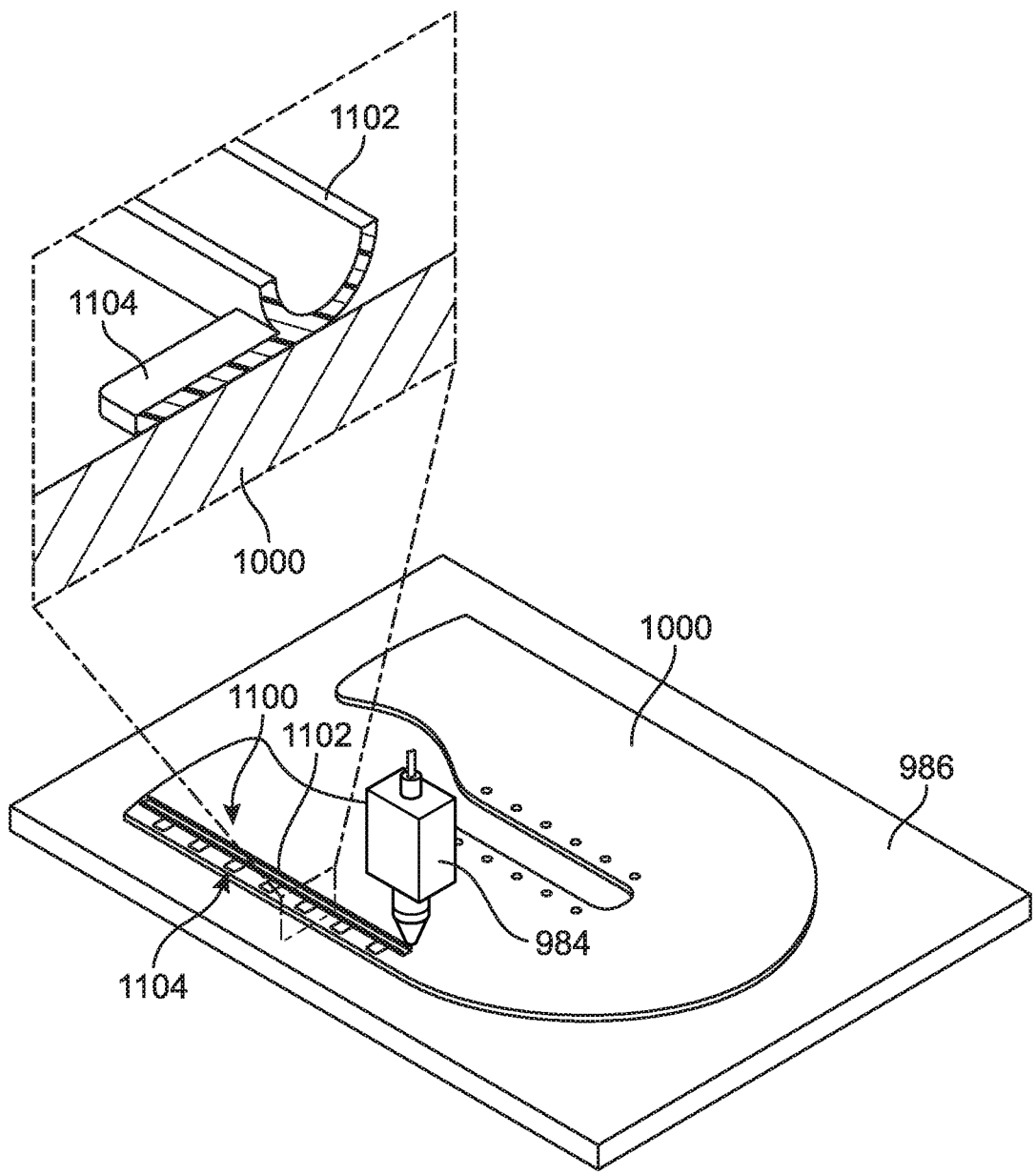
FIGS. 13-15 illustrate schematic views of forming an article with a tubular structure using three-dimensional printing techniques, according to an embodiment.

Additive manufacturing device 980 may include device housing 981, an actuating assembly 982 (see FIG. 12), and extrusion head 984 (see FIG. 13). Additive manufacturing device 980 may also include platform 986. In some cases, extrusion head 984 may be translated via actuating assembly 982 on a z-axis (i.e., vertical axis), while platform 986 of additive manufacturing device 980 may move in the x and y directions (i.e., horizontal axis). In other cases, extrusion head 984 could have full three-dimensional movement (e.g., x-y-z movement) above a fixed platform.

Embodiments can include provisions for controlling additive manufacturing device 980, as well as processing information related to the customization process. These provisions can include computing system 990 and a network. Generally, the term "computing system" refers to the computing resources of a single computer, a portion of the computing resources of a single computer, and/or two or more computers in communication with one another. Any of these resources can be operated by one or more human users. In some embodiments, computing system 990 may include one or more servers. In some cases, a separate server (not shown) may be primarily responsible for controlling and/or communicating with devices of manufacturing system 960, while a separate computer (e.g., desktop, laptop, or tablet) may facilitate interactions with a user or operator. Computing system 990 can also include one or more storage devices including, but not limited to, magnetic, optical, magneto-optical, and/or memory, including volatile memory and non-volatile memory.

Computing system 990 may comprise viewing interface 996 (e.g., a monitor or screen), input devices 997 (e.g., keyboard and/or mouse), and software for designing a computer-aided design ("CAD") representation of a three-dimensional model. In at least some embodiments, the CAD representation can provide a representation of an article of footwear as well as representations of elements of a tensioning system, such as a tubular structure.

In some embodiments, computing system 990 may be in direct contact with one or more devices or systems of manufacturing system 960 via network 999. The network may include any wired or wireless provisions that facilitate the exchange of information between computing system 990 and devices of manufacturing system 960. In some embodiments, the network may further include various components such as network interface controllers, repeaters, hubs, bridges, switches, routers, modems, and firewalls. In some cases, the network may be a wireless network that facilitates wireless communication between two or more systems, devices, and/or components manufacturing system 960.

Examples of wireless networks include, but are not limited to, wireless personal area networks (including, for example, Bluetooth), wireless local area networks (including networks utilizing the IEEE 802.11 WLAN standards), wireless mesh networks, mobile device networks as well as other kinds of wireless networks. In other cases, the network could be a wired network including networks whose signals are facilitated by twister pair wires, coaxial cables, and optical fibers. In still other cases, a combination of wired and wireless networks and/or connections could be used.

Figure 14:
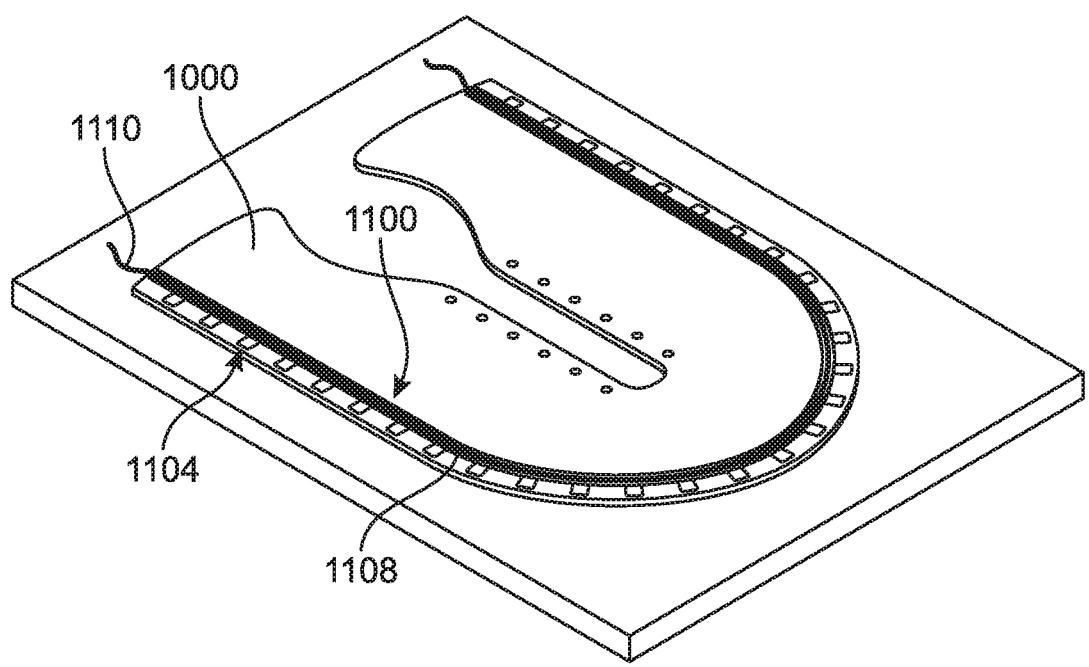
Figure 15:
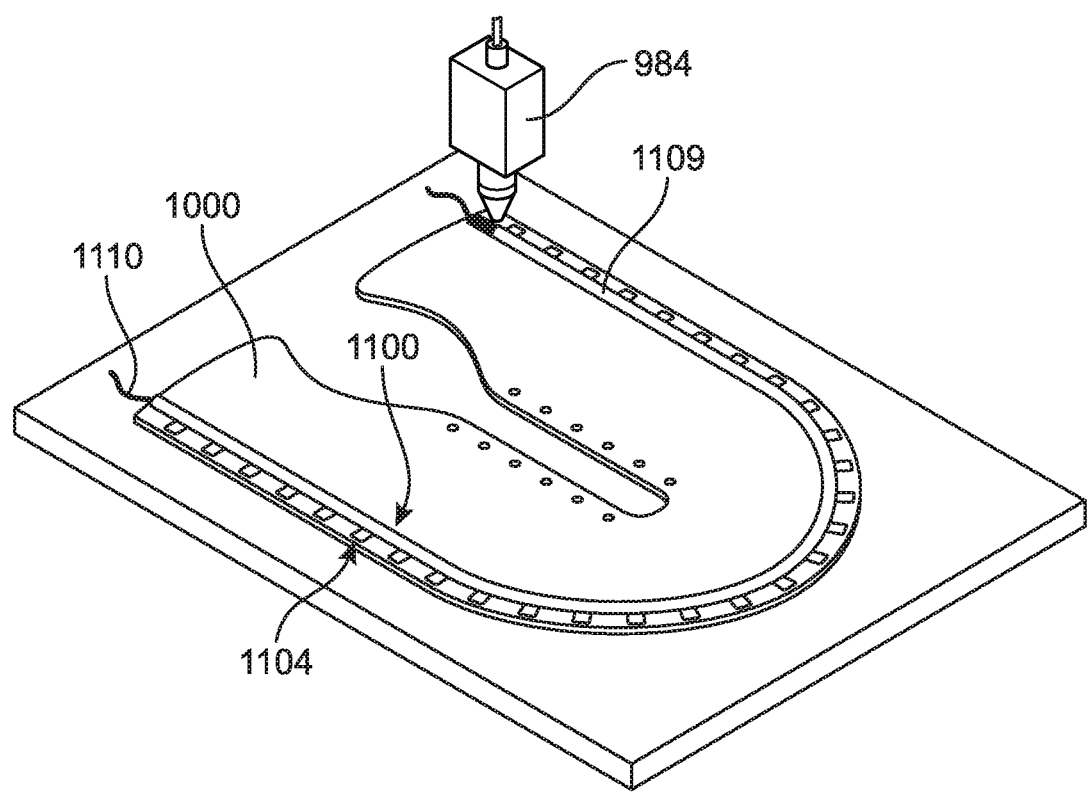

FIGS. 13-15 illustrate one exemplary process for forming a tubular structure with tabular portions so that the tabular portions are attached directly to an upper of an article of footwear. Referring first to FIG. 13, material component 1000, configured to be shaped into a three-dimensional upper 1202 (see FIG. 16), may be placed on platform 986 in preparation for printing. Extrusion head 984 may begin depositing (i.e., printing) a printable material onto material component 1000. As previously discussed with reference to the embodiment of FIG. 1, the term "printable material" is intended to encompass any materials that may be printed, ejected, emitted, or otherwise deposited during an additive manufacturing process. Such materials can include, but are not limited to, thermoplastics (e.g., PLA and ABS) and thermoplastic powders, high-density polyurethylene, eutectic metals, rubber, modeling clay, plasticine, RTV silicone, porcelain, metal clay, ceramic materials, plaster, and photopolymers, as well as possibly other materials known for use in 3D printing.

As shown in FIG. 13, during printing, a tubular structure is formed by printing part of tunnel portion 1102 as well as tab portions 1104 that extend from tunnel portion 1102. In the exemplary embodiment, the deposited printable material may directly bond with material component 1000 (i.e., the printable material and material component 1000 may be bond compatible) so that the resulting tubular structure 1100 is fixedly attached to material component 1000 (which is shaped into an upper at a later step in the process).

Next, as shown in FIG. 14, after lower section 1108 of tubular structure 1100 has been formed, tensile strand 1110 may be inserted into the partial tunnel of lower section 1108. Finally, as seen in FIG. 15, extrusion head 984 may be used to print the remaining upper section 1109 of tubular structure 1100, thereby enclosing a majority of tensile strand 1110. In the exemplary embodiment, tensile strand 1110 may be configured such that no bonding occurs between tensile strand 1110 and any printable material, thereby allowing tensile strand 1110 to translate through the resulting tunnel formed within tubular structure 1100.

Figure 16:
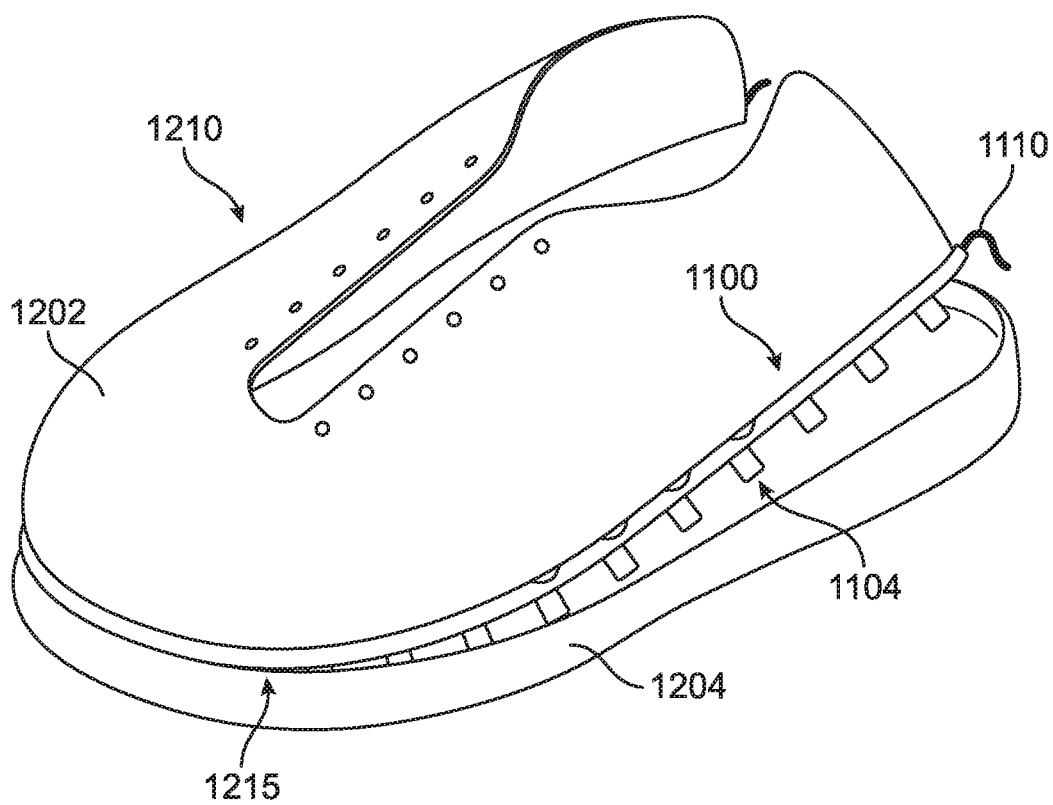
FIG. 16 is a schematic view of an embodiment of a step of attaching a sole structure to an upper so that tab portions of a tubular structure are engaged with the resulting article of footwear at a bite line.

Finally, as shown in FIG. 16, in some embodiments of the method, the resulting material component 1000 is formed into upper 1202. Upper 1202 may then be combined with sole structure 1204 to form article of footwear 1210. In some embodiments, tab portions 1104 may be arranged so that they are located at bite line 1215, and disposed between upper 1202 and sole structure 1204.

Figure 17:
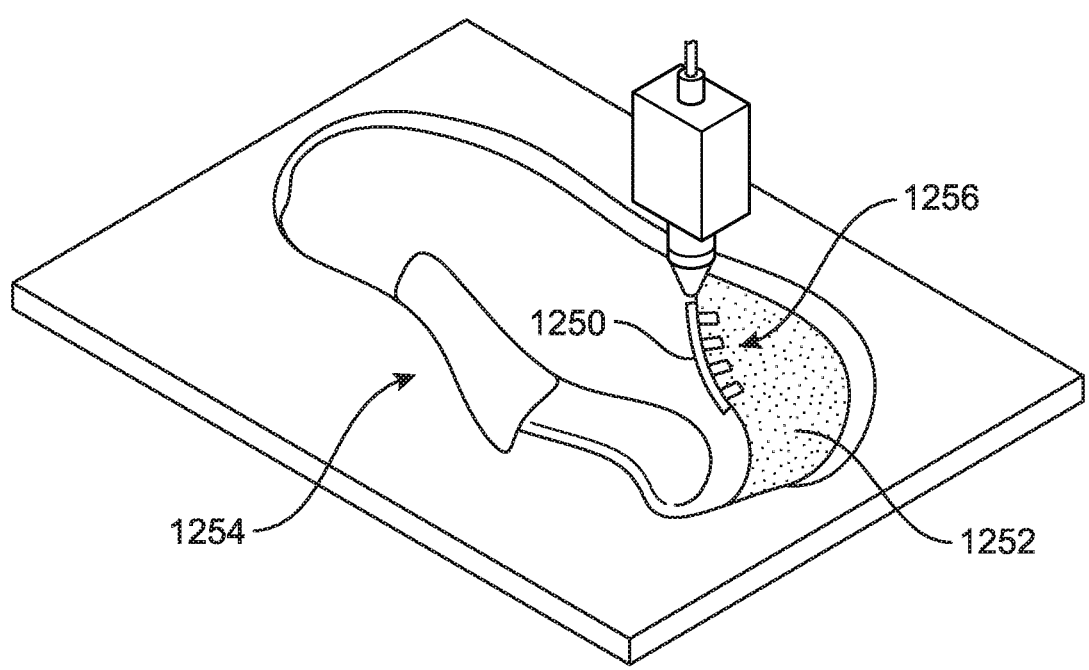
FIG. 17 is a schematic view of an embodiment of a step in a process of printing a tubular structure onto a heel counter.
Figure 18:
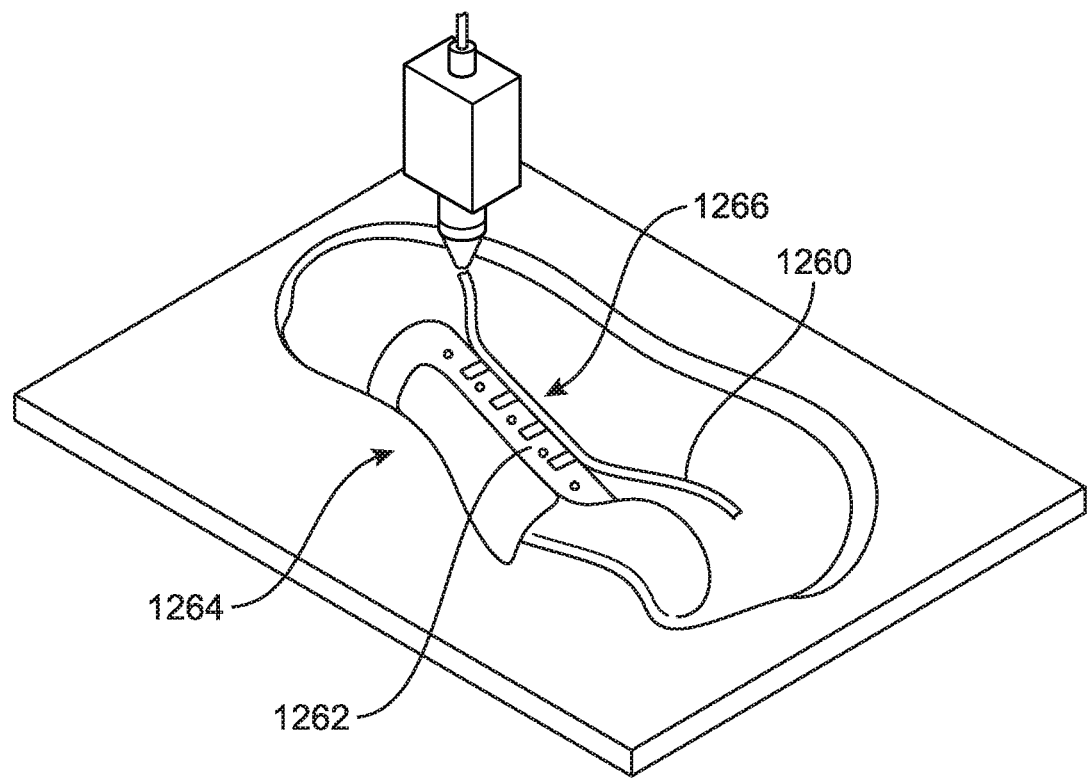
FIG. 18 is a schematic view of an embodiment of a step in a process of printing a tubular structure onto an eyestay.

It will be understood that the process shown in FIGS. 13-15 is only intended to be exemplary. In other embodiments, similar methods could be used to form a tubular structure that is attached at one or more tab portions to a heel counter, an eyestay, as well as any other structures on an article. As an example, FIG. 17 illustrates an embodiment where a segment of tubular structure 1250 is printed onto heel counter 1252 of article 1254. Specifically, tab portions 1256 are printed onto an outer surface of heel counter 1252 to directly attach tubular structure 1250 and heel counter 1252. Of course, in other embodiments, tab portions could be printed onto an inner surface of a heel counter, for example, prior to assembling the heel counter with an upper. As another example, FIG. 18 illustrates an embodiment where a segment of tubular structure 1260 is printed onto eyestay 1262 of article 1264. Specifically, tab portions 1266 are printed onto an outer surface of eyestay 1262 to directly attach tubular structure 1260 and eyestay 1262. Of course, in other embodiments, tab portions could be printed onto an inner surface of an eyestay, for example, prior to assembling the eyestay with the upper.

Alternatively, in other embodiments, the entire tubular structure printed could be printed and then a tensile strand could be inserted into the resulting fully formed tunnel. Such an alternative process is depicted in the Articles with Tubular Structures application described above. Furthermore, the embodiments could make use of any of the methods for printing tubular structures or segments onto articles as disclosed in U.S. Patent Application No. 62/263,834, filed Dec. 7, 2015, titled "Three-Dimensional Printing Utilizing a Captive Element" the entirety of which is herein incorporated by reference.

Figure 19:
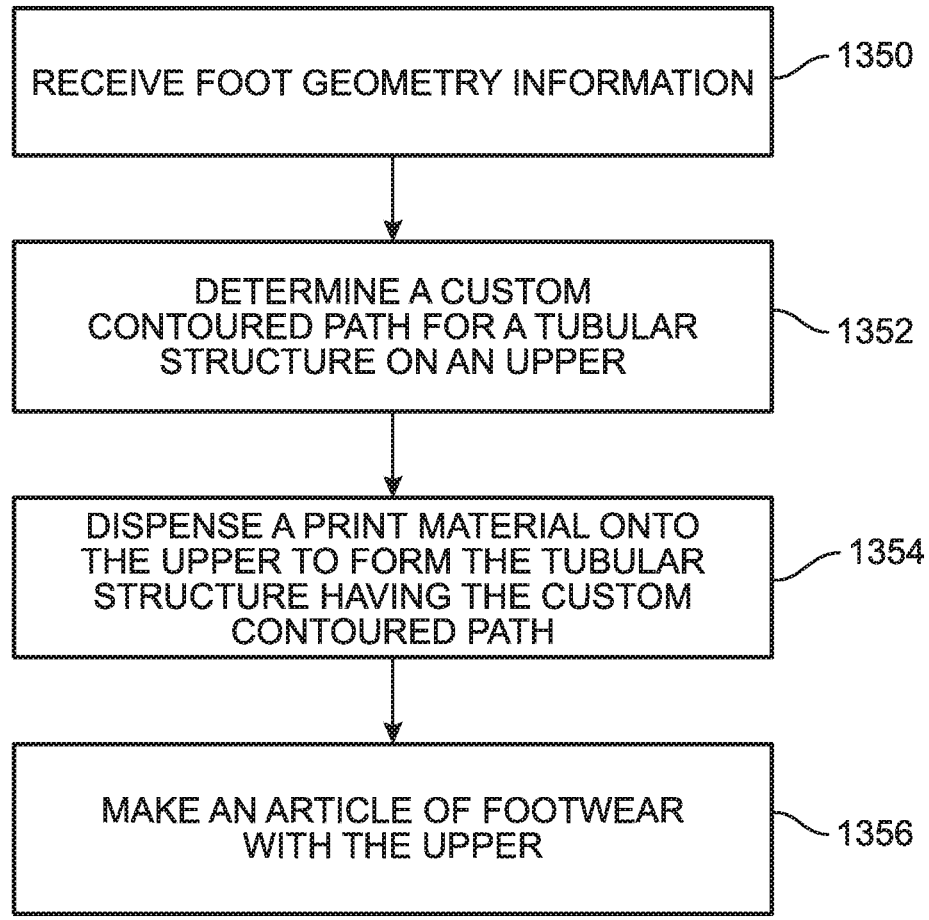
FIG. 19 is a schematic view of a process for forming a tubular structure with a customized contoured path on an article, according to an embodiment.

Some embodiments may include provisions for customizing the path of a tubular structure on an article. FIG. 19 depicts one such method, though it may be appreciated that embodiments could make use of any of the methods and provisions for forming tubular structures in customized arrangements as disclosed in the Articles with Tubular Structures application.

FIG. 19 illustrates an exemplary process for manufacturing an article with a tensioning system according to the embodiments. It may be appreciated that in some embodiments, one or more steps may be optional, while in other embodiments the process could include additional steps. The method, therefore, may not be limited to the particular steps or order of steps discussed here. It may also be appreciated that one or more steps could be accomplished by one or more of the following: a manufacturer, retail worker, customer, and/or third party.

In first step 1350, custom foot geometry information may be received. Such custom foot information could include information gathered from imaging devices and/or pressure-sensing devices that may provide information about the geometry of, and/or pressure distribution along the bottom of, a foot. Next, during step 1352, a custom contoured path for a tubular structure could be determined, for example, using software that automatically determines a custom contoured path from the custom foot information, or using software that allows a user to manually design a contoured path using the custom foot information. Next, during step 1354, a print material may be disposed onto an upper to form a tubular structure with the custom contoured path. Finally, during step 1356, an article of footwear can be manufactured using the upper with a tubular structure arranged in a customized path.

Additive manufacturing processes may be used to form structures on flat receiving surfaces as well as on contoured or non-flat surfaces. For example, some embodiments depicted in the figures may illustrate methods whereby material is printed onto a flattened surface of an article, such as a material section of an upper that has a flat or unassembled configuration. In such cases, printing material onto the surface may be accomplished by depositing material in thin layers that are also flat. Thus, a print head or nozzle may move in one or more horizontal directions to apply an Nth layer of material and then move in the vertical direction to begin forming the N+1 layer. However, it should be understood that in other embodiments material could be printed onto a contoured or non-flat surface. For example, material could be printed onto a three-dimensional last, where the surface of the last is not flat. In such cases, the printed layers applied to the surface may also be contoured. In order to accomplish this method of printing, a print head or nozzle may be configured to move along a contoured surface and tilt, rotate or otherwise move so that the print head or nozzle is always aligned approximately normal to the surface where printed material is being applied. In some cases, a print head could be mounted to a robotic arm, such as an articulated robotic arm with six degrees of freedom. Alternatively, in still other embodiments, an object with a contoured surface could be re-oriented under a nozzle so that contoured layers of printed material could be applied to the object. For example, embodiments could make use of any of the systems, features, components and/or methods disclosed in Mozeika et al., U.S. Patent Publication Number 2013/0015596, published Jan. 17, 2013 (and filed as U.S. application Ser. No. 13/530,664 on Jun. 22, 2012), titled "Robotic fabricator," the entirety of which is herein incorporated by reference. Embodiments could also make use of any of the systems, features, components and/or methods disclosed in Cannell et al., U.S. Pat. No. 8,123,350, issued Feb. 28, 2012, titled "Computerized apparatus and method for applying graphics to surfaces," the entirety of which is herein incorporated by reference. Thus, it may be appreciated that the present embodiments are not limited to printing processes used for printing to flat surfaces and may be used in conjunction with printing systems that can print to any kinds of surfaces having any kinds of geometry.

The printed structures of the present embodiments may provide enhanced support. In some cases, one or more printed structures may be attached to an underlying component such as a fabric layer of an upper or other article, and may act to enhance support over a portion of the component. This may occur in situations where the printed structure is more rigid than an underlying material (e.g., fabric, leather, etc.). In some cases, printed structures, such as tubular structures, could extend throughout portions of an article to form an external support system, like an exoskeleton, which helps provide increased support through those portions.

The embodiments further provide a comprehensive fit system that delivers a tuned and pressure-free fit for an article. This is accomplished by steering the articulated tunnel structures around bony prominences of the foot. When a tensile strand extending through the tunnel structures is pulled under tension (e.g., by the laces or another tensile element) the tunnel geometry and article-substrate (e.g., fabric layer) contract around predetermined zones of the foot.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

What is claimed is:

1. An article of footwear, comprising:
an upper;
a sole structure;
a tubular structure including a first end, a second end and an intermediate portion disposed between the first end and the second end;
the tubular structure forming a tunnel extending through the tubular structure from the first end to the second end, the tubular structure including a surface with a first opening between the first end and the second end;
a first tensile strand extending through at least a portion of the tunnel of the tubular structure;
a second tensile strand that extends across a portion of the upper and around the first tensile strand proximate the first opening;
the intermediate portion of the tubular structure further comprising a tubular portion and a plurality of tab portions that extend away from the tubular portion, the plurality of tab portions including a first tab portion and a second tab portion;
wherein the plurality of tab portions are attached to the article of footwear and anchor the tubular structure to the article of footwear, and the tubular structure between the first tab portion and the second tab portion extends along and adjacent to a periphery of the article of footwear where the upper is joined to the sole structure, and
wherein the tubular structure extends continuously from a lateral side to a medial side of the article of footwear.

2. The article of footwear according to claim 1, wherein the first tab portion and the second tab portion are disposed between the upper and the sole structure.

3. The article of footwear according to claim 1, wherein at least one of the first tab portion and the second tab portion are attached to a surface of the upper.

4. The article of footwear according to claim 2, wherein at least one of the first tab portion and the second tab portion are attached to a surface of the sole structure proximate the periphery of the article of footwear where the upper is joined to the sole structure.

5. The article of footwear according to claim 1, wherein: the article of footwear further includes a heel counter; and wherein at least one of the plurality of tab portions is attached to the heel counter.

6. The article of footwear according to claim 1, wherein: the article of footwear further includes an eyestay; and wherein at least one of the plurality of tab portions is attached to the eyestay.

7. An article of footwear, comprising:
an upper and a sole structure joined at least at a bite line of the article of footwear;
a tubular structure including a first end, a second end, and an intermediate portion disposed between the first end and the second end;
the tubular structure forming a tunnel extending through the tubular structure from the first end to the second end, wherein the intermediate portion of the tubular structure includes a surface with a plurality of openings including a first opening and a second opening, the first opening and the second opening extending to the tunnel;
a first tensile strand extending through the tunnel of the tubular structure;
a second tensile strand having a first portion attached to an attachment region of the article of footwear and a second portion engaged with the first tensile strand proximate the first opening, the second tensile strand extending across a portion of the upper and around the first tensile strand proximate the first opening;

a third tensile strand having a first portion attached to an attachment region of the article of footwear and a second portion engaged with the first tensile strand proximate the second opening, the third tensile strand extending across a portion of the upper and around the first tensile strand proximate the second opening; and wherein the intermediate portion extends continuously at the bite line from a rearfoot region to a forefoot region of the article of footwear.

8. The article of footwear according to claim 7, wherein the first tensile strand extends out of the first opening and engages the second tensile strand externally to the tunnel.

9. The article of footwear according to claim 7, wherein the second tensile strand extends into the first opening and engages the first tensile strand within the tunnel.

10. The article of footwear according to claim 7, wherein the intermediate portion includes a tab portion attached to the article of footwear proximate the bite line.

11. The article of footwear according to claim 7, wherein the first end of the tubular structure and the second end of the tubular structure each have an opening.

12. The article of footwear according to claim 7, wherein the intermediate portion includes more than two openings.

13. The article of footwear according to claim 7, wherein a spacing between the plurality of openings is regular.

14. The article of footwear according to claim 7, wherein a spacing between the plurality of openings is irregular.

15. The article of footwear according to claim 7, wherein two or more tensile strands pass through the tunnel.

16. The article of footwear according to claim 7, wherein an end of the first tensile strand exits the tunnel through one of the plurality of openings in the intermediate portion.

17. An article of footwear, comprising:

an upper;

a sole structure;

a tubular structure forming a tunnel, the tunnel being at least partially enclosed along an entire length of the tubular structure which extends from a first end to a second end of the tubular structure;

a plurality of openings in a sidewall of the tubular structure, the plurality of openings being spaced apart along the length of the tubular structure and including a first opening;

a first tensile strand extending through at least a portion of the tunnel of the tubular structure, the at least a portion extends from a rearfoot region to a forefoot region of the upper; and a second tensile strand that extends across a portion of the upper and around the first tensile strand proximate the first opening;

wherein the tubular structure extends continuously along at least a portion of one of a lateral side and a medial side of the upper with the tunnel extending along a longitudinal direction for the at least a portion of one of the lateral side and the medial side of the upper, and wherein the tubular structure extends continuously from the medial side to the lateral side of the upper.

18. The article of footwear of claim 17, wherein the tubular structure extends along the forefoot region of the upper.

19. The article of footwear of claim 17, wherein the tubular structure extends along a bite line of the upper.

* * * * *